(12) United States Patent
Sagi et al.

(10) Patent No.: US 6,854,318 B2
(45) Date of Patent: Feb. 15, 2005

(54) METHOD AND APPARATUS OF NONDESTRUCTIVE TESTING A SEALED PRODUCT FOR LEAKS

(76) Inventors: Nehemiah Hemi Sagi, 1436 N. Claridge Way, Carmel, IN (US) 46032; Guosen Ronald Zhang, 7797 Jamestown South Dr., Fishers, IN (US) 46038; Ranajit Rana Ghosh, 8249 Stonering Cir., Indianapolis, IN (US) 46268; Xuguang Wang, 6054D Georgetown Rd., Indianapolis, IN (US) 46254

( * ) Notice: Subject to any disclaimer, the term of this patent is extended or adjusted under 35 U.S.C. 154(b) by 0 days.

(21) Appl. No.: 10/146,558

(22) Filed: May 15, 2002

(65) Prior Publication Data

US 2002/0157455 A1 Oct. 31, 2002

Related U.S. Application Data

(60) Division of application No. 09/773,474, filed on Feb. 1, 2001, now Pat. No. 6,584,828, which is a continuation-in-part of application No. 09/466,341, filed on Dec. 17, 1999, now Pat. No. 6,308,556.

(51) Int. Cl.[7] .............................................. G01M 3/04
(52) U.S. Cl. ........................................................ 73/40
(58) Field of Search ......................... 73/40, 45.4, 49.3, 73/49.6, 52

(56) References Cited

U.S. PATENT DOCUMENTS

| | | |
|---|---|---|
| 1,193,488 A | 8/1916 | Thomas |
| 3,028,750 A | 4/1962 | Rondean |
| 3,360,981 A | 1/1968 | Badger |
| 4,118,973 A | 10/1978 | Tucker et al. |
| 4,170,892 A | * 10/1979 | Bailitis ........................ 73/23.2 |
| 4,246,788 A | 1/1981 | Olin et al. |
| 4,427,030 A | 1/1984 | Jouwsma |
| 4,487,062 A | 12/1984 | Olin et al. |
| 4,524,616 A | 6/1985 | Drexel et al. |
| 4,768,372 A | 9/1988 | Lehmann |
| 4,794,784 A | 1/1989 | Bley |
| 4,800,754 A | 1/1989 | Korpi |

(List continued on next page.)

FOREIGN PATENT DOCUMENTS

| | | | | |
|---|---|---|---|---|
| GB | 1387877 | * | 3/1975 | ............ G01M/3/28 |

OTHER PUBLICATIONS

Experimental Data and Theoretical Modeling of Gas Flows Through Metal Capillary Leaks, S.A. Tison, Vacuum, vol. 44, Nos. 11–12, pp. 1171 to 1175, 1993.
A "Universal Calibration Curve" for Laminar Flowmeters, by David A. Todd, Jr.
Guidance for Industry, Container and Closure Integrity Testing in Lieu of Sterility Testing as a Component of the Stability Protocol for Sterile Products, Draft Guidance—Not for Implementation, dated Jan. 28, 1998.
A survey of flow at low pressures, by Scott L. Thomson and William R. Owens, dated Aug. 19, 1974.
Varian Vacuum Technologies, Product Catalog 2000, Solutions for the millennium and beyond, by VARIAN.
Pumping and leak detection systems Products Catalogue, by ALCATEL.

*Primary Examiner*—Robert Raevis
(74) *Attorney, Agent, or Firm*—Baker & Daniels

(57) ABSTRACT

A method of testing a product for leaks includes applying to the product a reference pressure that is less than 50.6 KPa. The method also includes developing a gas flow through a leak detection sensor in response to applying the reference pressure to the product. Another step of the method includes determining, based upon the gas flow between the product and the pressure system, whether the product leaked an unacceptable amount during the test period.

11 Claims, 15 Drawing Sheets

U.S. PATENT DOCUMENTS

| | | |
|---|---|---|
| 4,803,868 A | 2/1989 | Vinton et al. |
| 4,841,776 A | 6/1989 | Kawachi et al. |
| 4,896,530 A | 1/1990 | Lehmann |
| 5,029,464 A | 7/1991 | Lehmann |
| 5,042,291 A | 8/1991 | Lehmann |
| 5,044,199 A | 9/1991 | Drexel et al. |
| 5,099,881 A | 3/1992 | Nakajima |
| 5,170,660 A | 12/1992 | Lehmann |
| 5,199,296 A | 4/1993 | Lehmann |
| 5,239,859 A | 8/1993 | Lehmann |
| 5,269,171 A | 12/1993 | Boyer |
| 5,287,729 A | 2/1994 | Lehmann |
| 5,297,427 A | 3/1994 | Shambayati |
| 5,305,638 A | 4/1994 | Saghatchi et al. |
| 5,333,491 A | 8/1994 | Lehmann |
| 5,398,721 A | 3/1995 | Pryor |
| 5,445,035 A | 8/1995 | Delajoud |
| 5,497,654 A | 3/1996 | Lehmann |
| 5,513,516 A | 5/1996 | Stauffer |
| 5,526,674 A | 6/1996 | Korpi |
| 5,535,624 A | 7/1996 | Lehmann |
| 5,554,805 A | 9/1996 | Bahrton |
| 5,760,294 A | 6/1998 | Lehmann |
| 5,861,546 A * | 1/1999 | Sagi et al. ............... 73/40.5 R |
| 5,907,093 A | 5/1999 | Lehmann |
| 5,915,270 A | 6/1999 | Lehmann |
| 5,962,776 A | 10/1999 | Lehmann |
| 6,082,184 A | 7/2000 | Lehmann |
| 6,167,750 B1 | 1/2001 | Lehmann |
| 6,185,987 B1 | 2/2001 | Lehmann |
| 6,202,477 B1 | 3/2001 | Lehmann |

* cited by examiner

US 6,854,318 B2

METHOD AND APPARATUS OF NONDESTRUCTIVE TESTING A SEALED PRODUCT FOR LEAKS

RELATED APPLICATION

This application is a divisional application of U.S. patent application Ser. No. 09/773,474, filed Feb. 1, 2001, now U.S. Pat. No. 6,584,828, which is a continuation-in-part of application No. 09/466,341, filed Dec. 17, 1999, now U.S. Pat. No. 6,308,556, the entire disclosure of which is hereby incorporated herein by reference.

FIELD OF THE INVENTION

The present invention relates to product testing, and more specifically to testing a product for leaks.

BACKGROUND OF THE INVENTION

Many products are produced in an air-tight manner for environmental, health, freshness, operational and/or other reasons. To meet the need for air-tight products, test equipment have been developed to test certain types of products for leaks. For example, U.S. Pat. No. 5,861,546 ('546 patent) to Sagi et al., the disclosure of which is hereby incorporated by reference, discloses a leak detection apparatus that is suitable for detecting leaks in a product having an opening to which a leak sensor and a vacuum system may be coupled in order to form a closed test system.

SUMMARY OF THE INVENTION

All pressure values provided are absolute pressures (i.e. not gauge pressures) unless otherwise indicated. The present invention utilizes technology which the Applicant has named "Mass Extraction Technology". A leak detection sensor that embodies Mass Extraction Technology generally measures the amount of total mass or mass flow of air or any other gas extracted from a product while the product is exposed to a constant vacuum. The mass extracted is related to a virtual defect size or virtual pin hole size of the product under test. Since at a given temperature and pressure, mass and volume of a gas are correlated, a leak detection sensor that embodies Mass Extraction Technology may alternatively measure the amount of total volume or volumetric flow of air or any other gas extracted from a product while the product is exposed to a vacuum. Leak detection sensors embodying the Mass Extraction Technology of the present invention can be manufactured to be extremely sensitive and measure levels as small as $1*10^{-6}$ std. cc/sec. or 0.15 micrograms/min at 0.133 KPa. Due to this extreme sensitivity with any gas, leak detection sensors of the present invention can be used to perform tests with inexpensive gases such as air or nitrogen which previously required much more expensive techniques and gases such as Helium Mass Spectrometry.

Pursuant to an exemplary embodiment, there is provided a method of testing a product for leaks. One step of the method includes applying to the product a reference pressure that is less than 50.6 KPa. Another step of the method includes developing a gas flow through a leak detection sensor in response to applying the reference pressure to the product. The method also includes the step of determining, based upon the gas flow between the product and the pressure system, whether the product leaked an unacceptable amount during the test period.

Pursuant to another exemplary embodiment, there is provided a leak detection system for testing a product for leaks. The leak detection system includes a chamber dimensioned to receive the product, a pressure system that maintains a pressure of less than 50.6 KPa during a test period, and a leak sensor coupled to the chamber via a first conduit and the pressure system via a second conduit. The leak sensor is operable to receive the reference pressure via the second conduit and apply the reference pressure to the chamber via the first conduit. The leak sensor is also operable to develop a gas flow from the chamber through the leak sensor to the pressure system as a result of applying the reference pressure to the chamber. The leak sensor is further operable to determine, based upon the gas flow between the chamber and the pressure system, whether the product leaked an unacceptable amount during the test period.

Pursuant to yet another exemplary embodiment, there is provided a leak detection system for testing a product having an opening for leaks. The leak detection system includes a pressure system that maintains a pressure of less than 50.6 KPa during a test period, and a leak sensor coupled to the opening of the product via a first conduit and the pressure system via a second conduit. The leak sensor is operable to receive the reference pressure via the second conduit and apply the reference pressure to the product via the first conduit. The leak sensor is also operable to develop a gas flow from the product through the leak sensor to the pressure system as a result of applying the reference pressure to the product. The leak sensor is further operable to determine, based upon the gas flow between the product and the pressure system, whether the product leaked an unacceptable amount during the test period.

DESCRIPTION OF EXEMPLARY EMBODIMENTS

Figure 1:
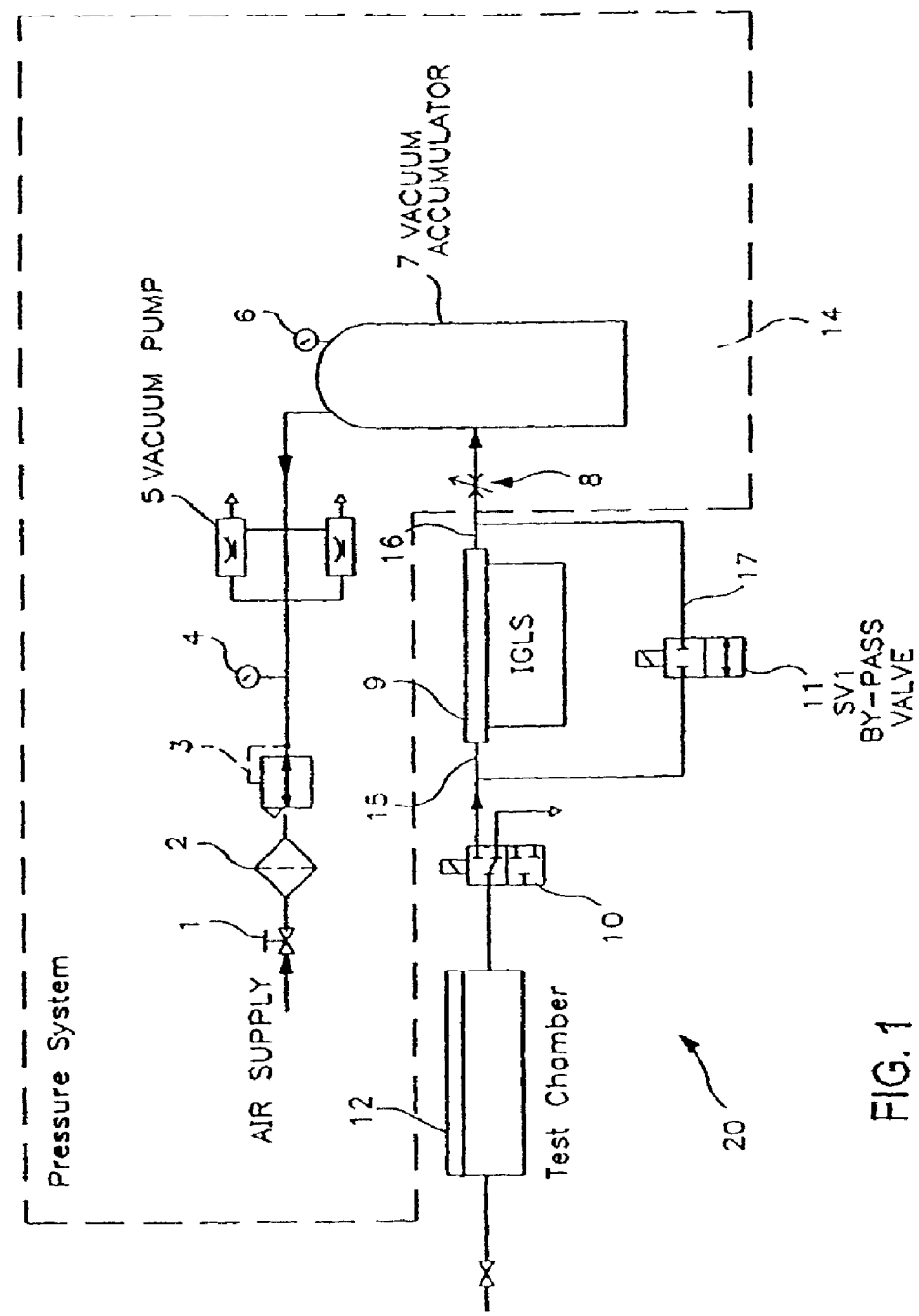
FIG. 1 is a schematic diagram of a first exemplary leak detection system.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 shows a schematic of a first exemplary leak detection system 20 that incorporates various features of the present invention. The first exemplary leak detection system 20 includes an intelligent gas leak sensor (IGLS) 9 and a pressure system 14. Furthermore, the exemplary leak detection system 20 may further include a test chamber 12 which is used to test products or units under test (UUT). The test chamber 12 is coupled to the IGLS 9 via an inlet conduit 15 comprising an exhaust valve 10, and the IGLS 9 is coupled to the pressure system 14 via an outlet conduit 16 comprising a needle valve 8. Furthermore, the test chamber 12 is coupled to the pressure system 14 via a by-pass conduit 17 comprising a by-pass valve 11 which provide a gas flow path that by-passes the IGLS 9.

The pressure system 14 is generally operable to maintain a reference pressure less than the surrounding environment in which the leak detection system 20 is operated. To this end, the pressure system 14 in an exemplary embodiment includes a vacuum accumulator 7, a pressure gauge 6, a vacuum pump 5, a pressure gauge 4, a pressure control valve 3, an air filter 2, and a ball valve 1 that are serially coupled to one another between an air supply and the outlet conduit 16. In operation, the vacuum accumulator 7 helps to reduce pressure fluctuations within the pressure system 14 and significantly increases overall system performance.

The IGLS 9 in an exemplary embodiment is operable to control clamping of the test chamber 12, control the exhaust valve 10, and control the by-pass valve 11. Moreover, the IGLS 9 is generally operable to obtain various measurements of gas flow between the test chamber 12 and the pressure system 14. In particular, the IGLS 9 is operable to obtain a measurement of the gas flow through the IGLS 9 at a particular point in time while controlling a near constant pressure within the IGLS 9 throughout a test period, calculate total mass, total volume, mass flow, and/or volumetric flow of the gas flow through the IGLS 9 during the test period, and determine whether a UUT such as a sealed package has a leak failure based upon the calculated total mass, total volume, mass flow rate, or volumetric flow rate of the gas flow through the IGLS 9 during the test period.

Figure 2:
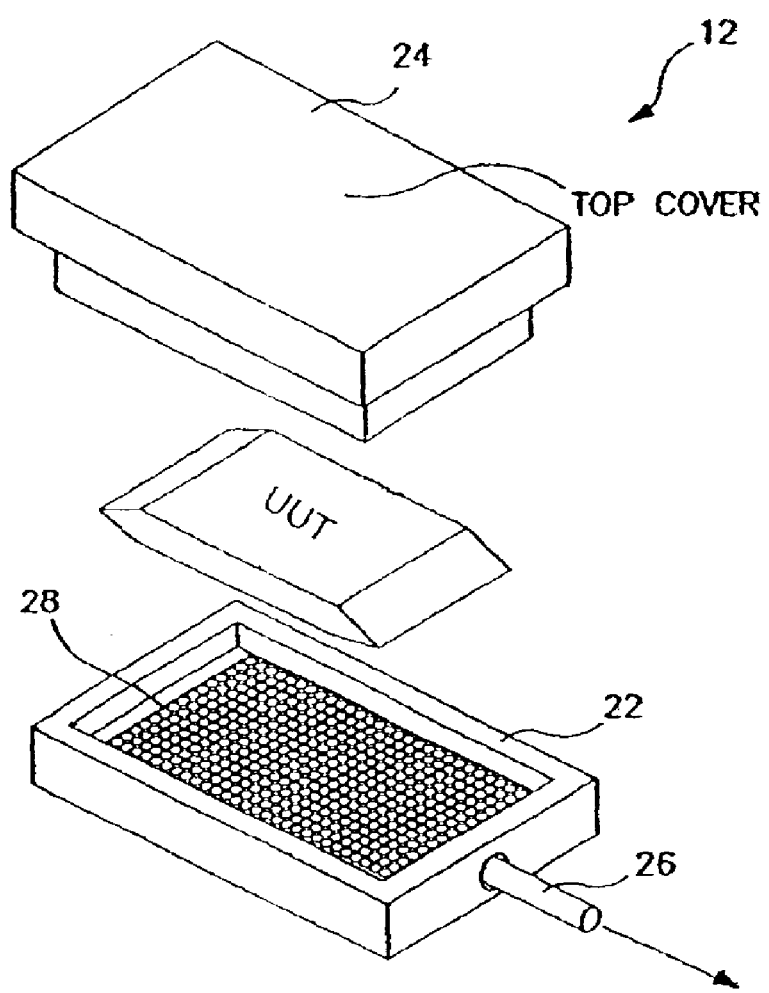
FIG. 2 is a perspective view of the exemplary test chamber shown in FIG. 1.

The test chamber 12 of the leak detection system 20 is generally operable to receive a UUT such as an air-tight package containing medical supplies, and subject the UUT to a controlled pressurized environment. To this end, the test chamber 12 as depicted in FIG. 2 includes a receptacle 22 dimensioned to receive the UUT to be tested for leaks, and a cover 24 that when placed in position with the receptacle 22 is operable to seal the receptacle 22 in an air-tight manner. In order to alter the internal pressure of the test chamber 12 and subject the UUT to a pressurized environment, the test chamber 12 further includes a outlet port 26 that provides a controllable gas flow path from the interior of the test chamber 12 to the exterior of the test chamber 12. In operation, the outlet port 26 is coupled to the pressure system 14 via the inlet conduit 15 in order to extract gas from the test chamber 12 in a controlled manner and to subject the UUT to the reference pressure maintained by the pressure system 14.

The test chamber 12 further includes a grid 28 that in the exemplary embodiment performs several functions. In particular, the grid 28 helps to prevent excessive contamination of the IGLS 9 by filtering contaminates from the gas flow. Moreover, the grid 28 helps to prevent the sealed package from blocking gas flow through the outlet port 26. Furthermore, the grid 28 along with other product supports (not shown) of the test chamber 12 help reduce mechanical stress exerted upon the UUT. Those skilled in the art should appreciate that when the internal pressure of the test chamber 12 is less than the internal pressure of a flexible UUT such as a sealed medical package, the flexible UUT will expand due to the lower pressure developed within the test chamber 12. The grid 26 along with other product supports of the test chamber 12 helps to reduce the amount a flexible sealed UUT expands within the test chamber 12 in order to prevent the destruction of the sealed UUT. In particular, the test chamber 12 of an exemplary embodiment has a clam-shell design in which the grid 26 and the other product supports provide a near form fit to the UUT in order to minimize the dead volume within the test chamber 12 during a test and thereby improve the response time of the test.

Figure 3:
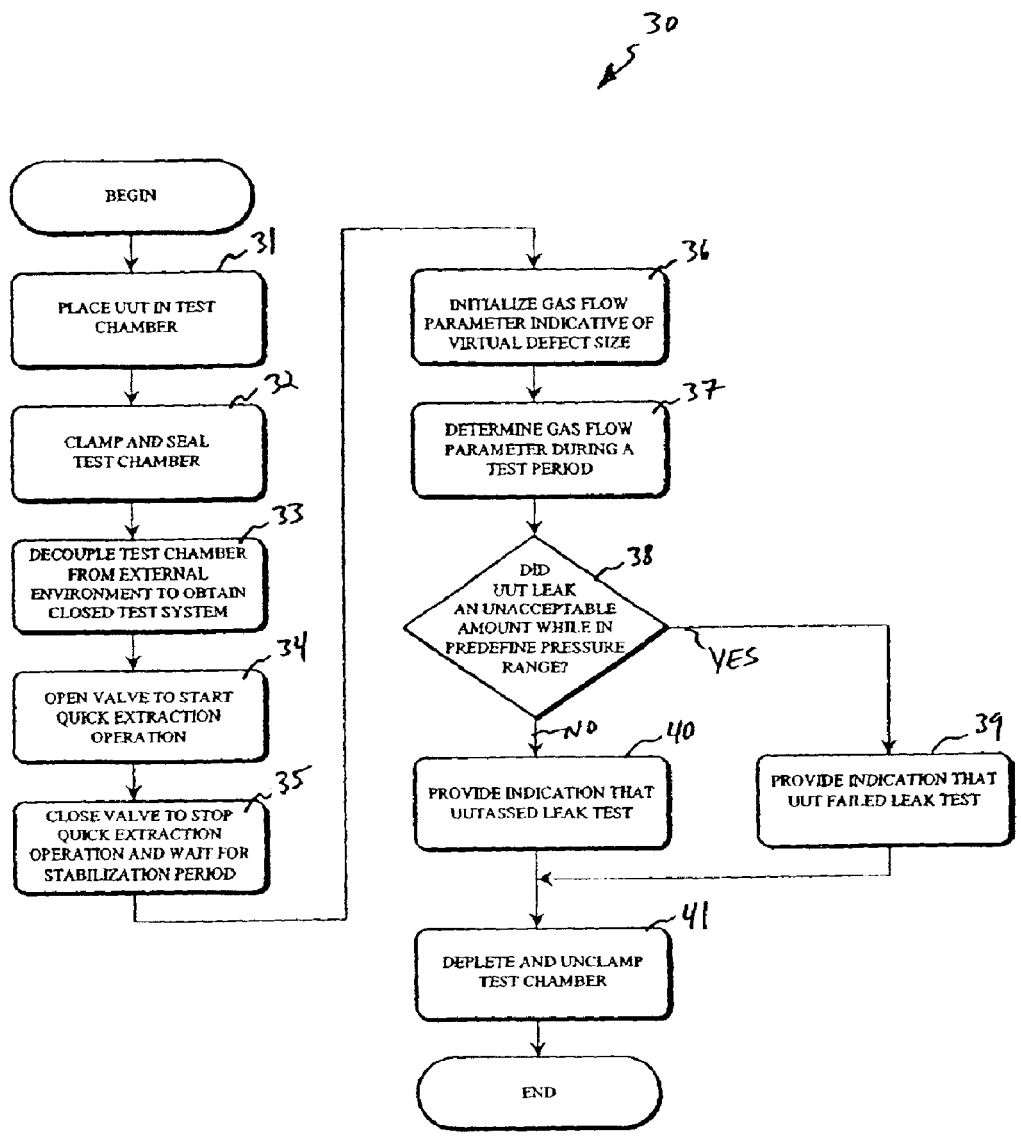
FIG. 3 is a flowchart of an exemplary leak detection method implemented by the first leak detection system shown in FIG. 1.

Referring now to FIG. 3, there is illustrated a flowchart of an exemplary leak detection method 30 implemented by the leak detection system 20. In particular, the leak detection method 30 begins in step 31 with the placement of the UUT into the receptacle 22 of the test chamber 12. In an exemplary automated system, a mechanical arm or other device places the UUT into the test chamber 12. Alternatively, a person could place the UUT into the receptacle 22. Then in step 32, the IGLS 9 generates a clamp signal that causes the cover 24 of the test chamber 12 to clamp into place and seal the test chamber 12. Alternatively, a person could place the cover 24 into place and seal the test chamber 12. After the test chamber 12 is sealed, the IGLS 9 in step 33 generates one or more control signals that cause the exhaust valve 10 to operably decouple the outlet port 26 of the test chamber 12 from the surrounding environment and couple the outlet port 26 of the test chamber 12 to the pressure system 14 thus creating a closed test system.

In the exemplary embodiment, the IGLS 9 in step 34 generates one or more control signals that cause the by-pass valve 11 to open for a predetermined quick extraction period (e.g. 3 to 5 seconds). As result of opening the by-pass valve 11, the pressure system 14 via the by-pass conduit 17 quickly extracts mass from the test chamber 12 to quickly bring the internal pressure of the test chamber 12 closer to the reference pressure maintained by the pressure system 14. In the exemplary embodiment, the IGLS 9 provides a more restrictive gas flow path between the test chamber 12 and the pressure system 14 than the gas flow path provided by the by-pass conduit 17. Accordingly, opening the by-pass valve 11 causes the internal pressure of the test chamber 12 to more quickly approach the reference pressure maintained by the pressure system 14 and reduce the overall time required to test the UUT. In an exemplary embodiment, the predetermined quick extraction period is determined during a calibration process for the type of test chamber 12 to be used and the type of sealed UUT to be tested. From the calibration process, the exemplary embodiment determines a quick extraction period that is sufficient for the pressure system 14 to bring the internal pressure of the test chamber 12 near the reference pressure maintained by the pressure system 14.

After performing the quick extraction operation in step 34, the IGLS 9 in step 35 generates one or more control signals that cause the by-pass valve 11 to close and then waits for a predetermined stabilization period (e.g. 0.8 seconds). As a result of closing the by-pass valve 11, gas flow between the test chamber 12 and the pressure system 14 is restricted to pass through the IGLS 9. The IGLS 9 in step 36 initializes a gas flow parameter (e.g. total mass value, total volume value, mass flow rate, volumetric flow rate) indicative of a virtual defect size of the UUT. In particular, the IGLS 9 in an exemplary embodiment initializes the gas flow parameter to a value of zero.

The IGLS 9 in step 37 calculates a gas flow parameter of the gas flow through the IGLS 9 during a predetermined test period (e.g. 5–10 seconds). In order to calculate the gas flow parameter, the IGLS 9 in an exemplary embodiment generates at periodic intervals a mass flow rate value $(dM/dt)_n$ representative of the mass flow rate of gas through the IGLS 9 during an interval n and updates the total mass value M after each periodic interval n by adding to the current total mass value M, the product of the mass flow rate value $(dM/dt)_n$ times the duration of the associated interval n. Alternatively, or in addition to, the IGLS 9 generates at periodic intervals a volumetric flow rate value $(dQ/dt)_n$ representative of the volumetric flow rate of the gas through the IGLS 9 during an interval n and updates a total volume value V after each periodic interval n by adding to the current total volume value V, the product of the volumetric flow rate value $(dQ/dt)_n$ times the duration of the associated interval n.

The IGLS 9 then in step 38 determines based upon the obtained gas flow parameter (e.g. total mass, total volume, mass flow rate at a particular point, volumetric flow rate at a particular point) for the gas flow through the IGLS 9 during the test period whether the UUT leaked an unacceptable amount during the test period. More specifically, the IGLS 9 in an exemplary embodiment compares the total mass value M for the gas flow during the test period to a predetermined threshold level and determines that the UUT leaked an unacceptable amount if the total mass has a predetermined relationship to the threshold level. For example, the pressure system 40 in an exemplary embodiment applies a reference pressure that is below atmospheric conditions to the test chamber 80 and the IGLS 9 determines that the UUT leaked an unacceptable amount if the total mass extracted during the test period is greater than the predetermined threshold. In an alternative embodiment, the IGLS 9 compares the total volume value V for the gas flow during the test period to a predetermined threshold level and determines that the UUT leaked an unacceptable amount if the total volume has a predetermined relationship to (e.g. greater than) the threshold level. Similarly, the IGLS 9 in yet another exemplary embodiment compares the total mass flow rate for the gas flow obtained at a predetermined point during the test period to a predetermined threshold level and determines that the UUT leaked an unacceptable amount if the total mass flow rate has a predetermined relationship to (e.g. greater than) the threshold level.

The leak detection system 20 when testing a series of units should extract a relatively constant amount of mass or volume from the test chamber 12 during each test period if the units do not leak. Similarly, the leak detection system 20 when testing a series of units should develop similar mass flow rate and volumetric flow rate signatures during each test period if the units do not leak. However, if a UUT does leak, then the leak detection system 20 should extract additional mass or volume from the test chamber 12 that is attributable to the mass leaked by the UUT. Similarly, if a UUT does leak, then the leak detection system 20 should develop a mass flow rate signature or a volumetric flow signature having a greater value at a predetermined point during the test period. In this manner, the leak detection system 20 is operable to detect whether a sealed UUT leaked an unacceptable amount during the test period by comparing the total mass, total volume, mass flow rate, and/or volumetric flow rate to a predetermined threshold level.

It should be appreciated that the total mass, total volume, mass flow rate, and volume flow rate are all indicative of a virtual defect size of the UUT. The virtual defect size of the UUT is essentially a measurement of the combined effective area of all defects of the UUT. For example, a UUT having 10 defects each having an effective area of 1 micrometer squared has a virtual defect size of 10 micrometers squared (i.e. the total effective area of all defects of the UUT). Accordingly, the total mass, total volume, mass flow rate, and volume flow rate can be related to a virtual hole size to determine whether the UUT meets a virtual defect size requirement. For example, in the medical industry, packages are often required to have a virtual defect size of 0.2 micrometers or less which relates to the smallest known living organism. Due to the total mass, total volume, mass flow rate, and volumetric flow rate being dependent upon the virtual defect size of the UUT, the leak detection system 20, 200, 300, 400 may be configured to determine whether the UUT satisfies a virtual defect size requirement based upon these determined gas flow parameters.

If the IGLS 9 in step 38 determines that the UUT leaked an unacceptable amount during the test period, then the IGLS 9 in step 39 provides an indication that the UUT failed the leak test. Conversely, if the IGLS 9 in step 38 determines that the UUT did not leak an unacceptable amount during the test period, then the IGLS 9 in step 40 provides an indication that the sealed UUT passed the leak test. As should be appreciated by those skilled in the art, the IGLS 9 may provide the above status indications in many known manners such as distinguishing audible tones, visible lights, textual displays, and/or electronic signals. After indicating the status of the sealed UUT, the IGLS 9 generates in step 41 one or more control signals that cause the test chamber 12 to deplete and the cover 24 of the test chamber 12 to unclamp from the receptacle 22. Alternatively, a person could manually cause the test chamber 12 to deplete and manually unclamp the cover 24 from the receptacle 22 of the test chamber 12.

Figure 4:
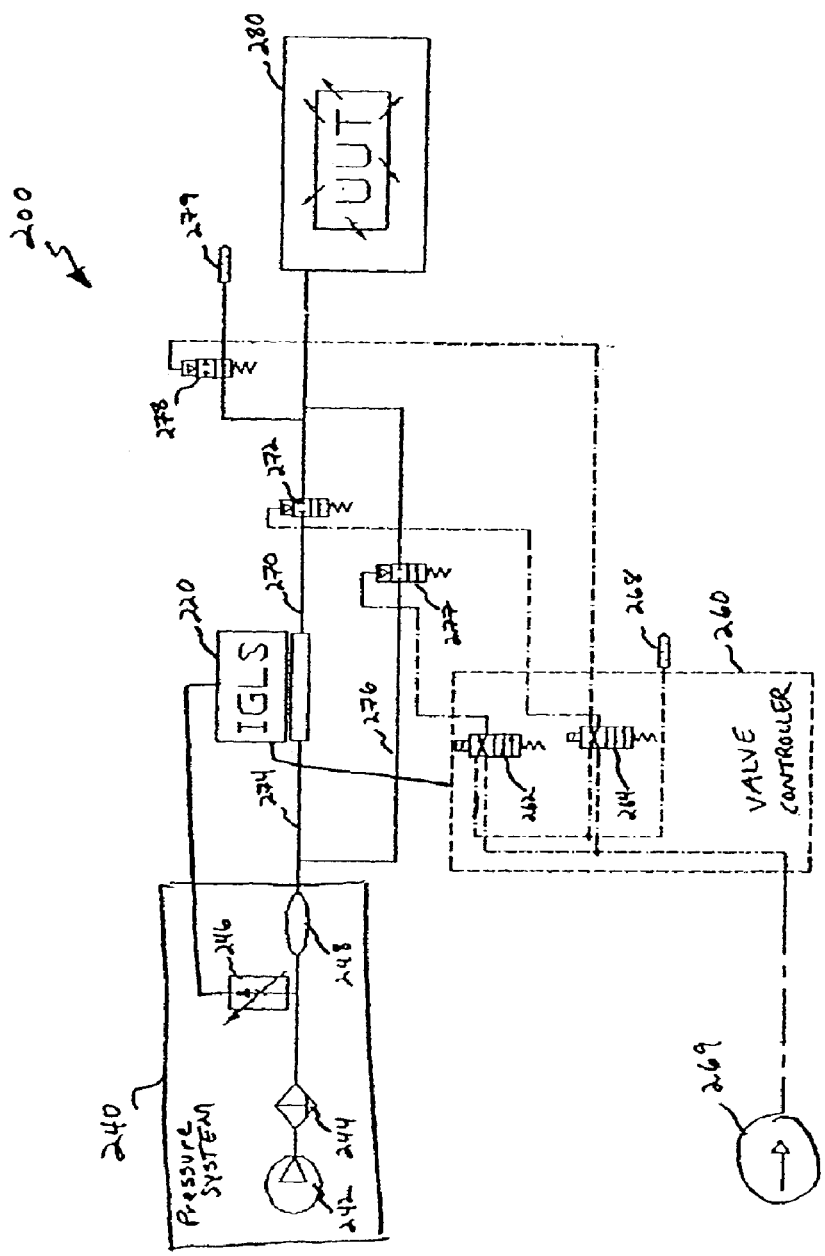
FIG. 4 is a schematic diagram of a second exemplary leak detection system.

Referring now to FIG. 4, a schematic of a second exemplary leak detection system 200 that incorporates various features of the present invention is shown. The second exemplary leak detection system 200 includes an intelligent gas leak sensor (IGLS) 220, a controllable pressure system 240, valve controller 260, and a test chamber 280 which may be implemented in a manner similar to the test chamber 12 of FIG. 2. The test chamber 280 is coupled to the IGLS 220 via an inlet conduit 270 having an inlet valve 272, and the IGLS 220 is coupled to the controllable pressure system 240 via an outlet conduit 274. Furthermore, the test chamber 280 is coupled to the controllable pressure system 240 via a by-pass conduit 276 having a by-pass valve 277. The by-pass conduit 276 and by-pass valve 277 generally provide a controllable gas flow path between the test chamber 280 and the controllable pressure system 240 that by-passes the IGLS 220. Furthermore, the test chamber 280 is coupled to the surrounding environment via an exhaust valve 278 and a muffler 279 that provide a gas flow path for quickly returning the internal pressure of the test chamber 280 to atmospheric conditions.

In an exemplary embodiment, the by-pass valve 277 is implemented with a larger valve than the inlet valve 272. The larger by-pass valve 277 provides a less restrictive gas flow thus increasing the flow rate through by-pass conduit 276 and reducing a quick extraction period of time. On the other hand, less air is required in order to fill the smaller inlet valve 272 than is required to fill the larger by-pass valve 277. Accordingly, the smaller inlet valve 272 helps reduce the response time the leak detection system 200 during extremely low flow test conditions.

The controllable pressure system 240 is generally operable to apply a reference pressure to the UUT via the IGLS 220 at a level that is controllable by the IGLS 220. To this end, the controllable pressure system 240 in an exemplary embodiment includes a vacuum pump 242, an air filter 244, a flow controller 246, and an accumulator 248 that are operably coupled to the IGLS 220 via outlet conduit 274. The vacuum pump 242 generally develops a gas flow through the air filter 244, the flow controller 246, and the accumulator 248 by extracting air therefrom. The flow controller 246 is operably coupled to the IGLS 220 in order to allow the IGLS 220 to control the flow of gas through the leak detection system 200. In particular, the flow controller 246 of the exemplary embodiment comprises a stepper motor (not shown) coupled to a needle valve (not shown) such that rotation of the stepper motor effects the flow of gas through the needle valve. Accordingly, fine grain control of the gas flow through the leak detection system 200 may be maintained via the flow controller 246 by adjusting an electronic control signal applied to the stepper motor.

The valve controller 260 is coupled to the IGLS 220, the inlet valve 272, the by-pass valve 277, and the exhaust valve 278. The valve controller 260 generally controls opening and closing of the inlet valve 272, the by-pass valve 277, and the exhaust valve 278 based upon information received from the IGLS 220. In an exemplary embodiment, the inlet valve 272, the by-pass valve 277, and the exhaust valve 278 are pneumatically operated. Accordingly, the valve controller 260 of the exemplary embodiment includes a first control valve 262 that pneumatically couples the an air source 269 to the by-pass valve 277 in order to pneumatically control the opening and closing of the by-pass valve 277. Furthermore, the valve controller 260 of the exemplary embodiment includes a second control valve 264 that pneumatically couples the air source 269 to the inlet valve 272 and the exhaust valve 278 in order to pneumatically control the opening and closing of the valves 272, 278. Furthermore, the first control valve 262 and the second control valve 264 of the valve controller 260 are pneumatically coupled to the surrounding atmosphere via muffler 268 in order to release air in an audio-dampened manner.

The first control valve 262 and the second control valve 264 of the valve controller 260 are also electrically coupled to the IGLS 220 in order to receive electric control signals from the IGLS 220. However, the leak detection system 200 may alternatively be implemented with hydraulically or electrically controlled valves 272, 277, 278. Further, depending upon the input requirements of the valves 272, 277, 278, the IGLS 220 may be implemented to directly control the opening and closing of the valves 272, 277, 278 instead of controlling the opening and closing of the valves indirectly via the valve controller 260, thus eliminating the need for the valve controller 260.

The IGLS 220 is operable to control clamping of the test chamber 280, control the internal pressure of the IGLS 220 by adjusting the flow controller 246, and control the inlet valve 272, the by-pass valve 277, and the exhaust valve 278. Moreover, the IGLS 220 is generally operable to obtain various measurements of gas flow between the test chamber 280 and the pressure system 240. In particular, the IGLS 220 is operable to obtain a measurement of the mass flow rate or volumetric flow rate of the gas flow through the IGLS 220 at a particular point in time while controlling a near constant pressure within the IGLS 220 throughout a test period, calculate total mass, total volume, mass flow, and/or volumetric flow of the gas flow through the IGLS 220 during the test period, and determine whether a UUT such as a sealed package has a leak failure based upon the calculated total mass, total volume, mass flow rate and/or volumetric flow rate of the gas flow through the IGLS 220 during the test period.

Figure 5:
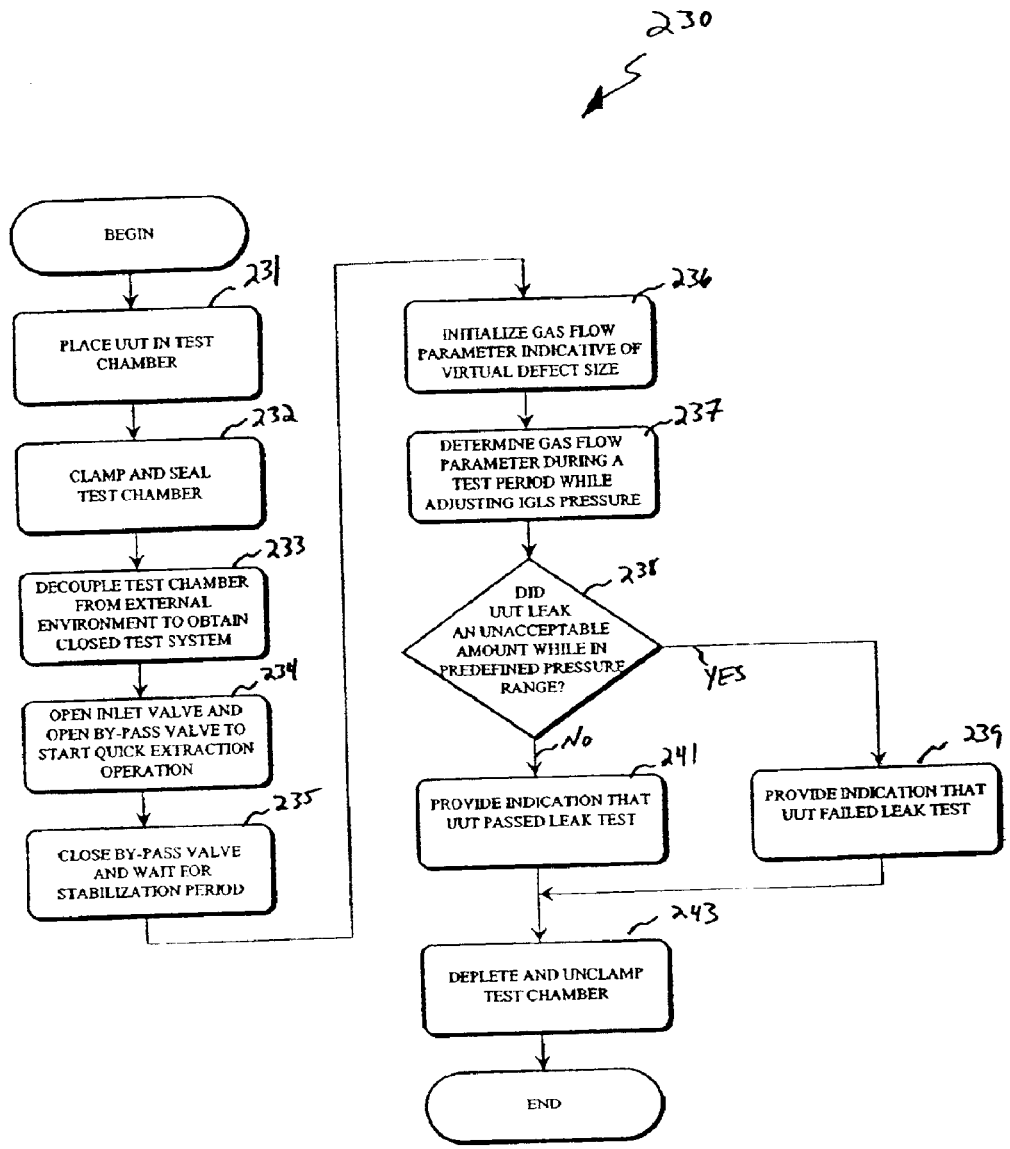
FIG. 5 is a flowchart of an exemplary leak detection method implemented by the second leak detection system shown in FIG. 4.

A flowchart of an exemplary leak detection method 230 implemented by the leak detection system 200 is illustrated in FIG. 5. In particular, the leak detection method 230 begins in step 231 with the placement of the UUT into the test chamber 280. In an exemplary automated system, a mechanical arm or other device places the UUT into the test chamber 280. Alternatively, a person could place the UUT into the test chamber 280. Then in step 232, the IGLS 220 generates a clamp signal that causes the test chamber 280 to seal in an air tight manner. Alternatively, a person could manually seal the test chamber 280. After the test chamber 280 is sealed, the IGLS 220 in step 233 generates one or more control signals that cause the exhaust valve 278 to operably decouple the test chamber 280 from the surrounding environment and couple the test chamber 280 to the pressure system 240 thus creating a closed test system.

In the exemplary embodiment, the IGLS 220 in step 234 generates one or more control signals that cause the inlet valve 272 to open and the by-pass valve 278 to open for a predetermined quick extraction period (e.g. 3 to 5 seconds). As result of opening the by-pass valve 272, the pressure system 240 via the by-pass conduit 278 quickly extracts mass from the test chamber 280 to quickly bring the internal pressure of the test chamber 280 closer to the reference pressure maintained by the pressure system 240. In the exemplary embodiment, the IGLS 220 and the inlet valve 272 provides a more restrictive gas flow path between the test chamber 280 and the pressure system 240 than the gas flow path provided by the by-pass conduit 276 and the by-pass valve 277. Accordingly, opening the by-pass valve 277 causes the internal pressure of the test chamber 280 to more quickly approach the reference pressure maintained by the pressure system 240 and reduces the overall time required to test the UUT. In an exemplary embodiment, the predetermined quick extraction period is determined during a calibration process for the type of test chamber 280 to be used and the type of UUT. From the calibration process, the exemplary embodiment determines a quick extraction period that is sufficient for the pressure system 240 to bring the internal pressure of the test chamber 280 near the reference pressure maintained by the pressure system 240.

After performing the quick extraction operation in step 234, the IGLS 220 in step 235 generates one or more control signals that cause the by-pass valve 277 to close and then waits for a predetermined stabilization period (e.g. 0.8 seconds). As a result of closing the by-pass valve 277, gas flow between the test chamber 280 and the pressure system 240 is restricted to pass through the IGLS 220. The IGLS 220 in step 236 initializes a gas flow parameter (e.g. total mass value, total volume value, mass flow rate, volumetric flow rate) that is indicative of a virtual defect size of the UUT. In particular, the IGLS 220 in an exemplary embodiment initializes the gas flow parameter to a value of zero.

The IGLS 220 in step 237 calculates a gas flow parameter of the gas flow through the IGLS 220 during a predetermined test period (e.g. 5–10 seconds) and continually adjusts the flow controller 246 in order to maintain a programmable pressure within the IGLS 220. In particular, the IGLS 220, in an exemplary embodiment, periodically determines the pressure in the IGLS 220 and generates one or more control signals which cause the flow controller 246 of the controllable pressure system 240 to adjust the pressure applied to the IGLS 220 by an amount needed to maintain the desired pressure in the IGLS 220. By adjusting the pressure within the IGLS 220, the IGLS 220 may more quickly determine whether a given UUT leaked an acceptable or an unacceptable amount.

Further, in order to calculate the gas flow parameter, the IGLS 220 in an exemplary embodiment generates at periodic intervals a mass flow rate value $(dM/dt)_n$ representative of the mass flow rate of gas through the IGLS 220 during an interval n and updates the total mass value M after each periodic interval n by adding to the current total mass value M, the product of the mass flow rate value $(dM/dt)_n$ times the duration of the associated interval n. Alternatively, or in addition to, the IGLS 220 generates at periodic intervals a volumetric flow rate value $(dQ/dt)_n$ representative of the volumetric flow rate of the gas through the IGLS 220 during an interval n and updates a total volume value V after each periodic interval n by adding to the current total volume value V, the product of the volumetric flow rate value $(dQ/dt)_n$ times the duration of the associated interval n.

The IGLS 220 then in step 238 determines based upon the obtained gas flow parameter (e.g. total mass, total volume, mass flow rate at a particular point, volumetric flow rate at a particular point) for the gas flow through the IGLS 220 during the test period whether the UUT leaked an unacceptable amount during the test period. More specifically, the IGLS 220 in an exemplary embodiment compares the total mass value M for the gas flow during the test period to a predetermined threshold level and determines that the UUT leaked an unacceptable amount if the total mass has a predetermined relationship to the threshold level. For example, the pressure system 240 in an exemplary embodiment applies a reference pressure that is below atmospheric conditions to the test chamber 280 and the IGLS 220 determines that the UUT leaked an unacceptable amount if the total mass extracted during the test period is greater than the predetermined threshold. In an alternative embodiment, the IGLS 220 compares the total volume value V for the gas flow during the test period to a predetermined threshold level and determines that the UUT leaked an unacceptable amount if the total volume has a predetermined relationship to (e.g. greater than) the threshold level. Similarly, the IGLS 220 in yet another exemplary embodiment compares the total mass flow rate for the gas flow obtained at a predetermined point during the test period to a predetermined threshold level and determines that the UUT leaked an unacceptable amount if the total mass flow rate has a predetermined relationship to (e.g. greater than) the threshold level.

The IGLS 220 then in step 238 determines based upon the obtained total mass of gas flow through the IGLS 220 during the test period whether the UUT leaked an unacceptable amount during the test period. More specifically, the IGLS 220 compares the total mass value M for the gas flow during the test period to a predetermined threshold level and determines that the sealed UUT leaked an unacceptable amount if the total mass has a predetermined relationship to the threshold level. For example, the pressure system 240 in an exemplary embodiment applies a reference pressure below atmospheric conditions to the test chamber 280 and the IGLS 220 determines that the UUT leaked an unacceptable amount if the total mass extracted during the test period is greater than the predetermined threshold.

If the IGLS 220 in step 238 determines that the UUT leaked an unacceptable amount during the test period, then the IGLS 220 in step 239 provides an indication that the UUT failed the leak test. Conversely, if the IGLS 220 in step 238 determines that the UUT did not leak an unacceptable amount during the test period, then the IGLS 220 in step 241 provides an indication that the UUT passed the leak test. The IGLS 220 may provide the above status indications in many known manners such as distinguishing audible tones, visible lights, textual displays, and/or electronic signals. After indicating the status of the UUT, the IGLS 220 generates one or more control signals that cause the exhaust valve 278 to open and deplete the test chamber 280 in step 343. Alternatively, a person could manually deplete the test chamber 280.

Figure 6:
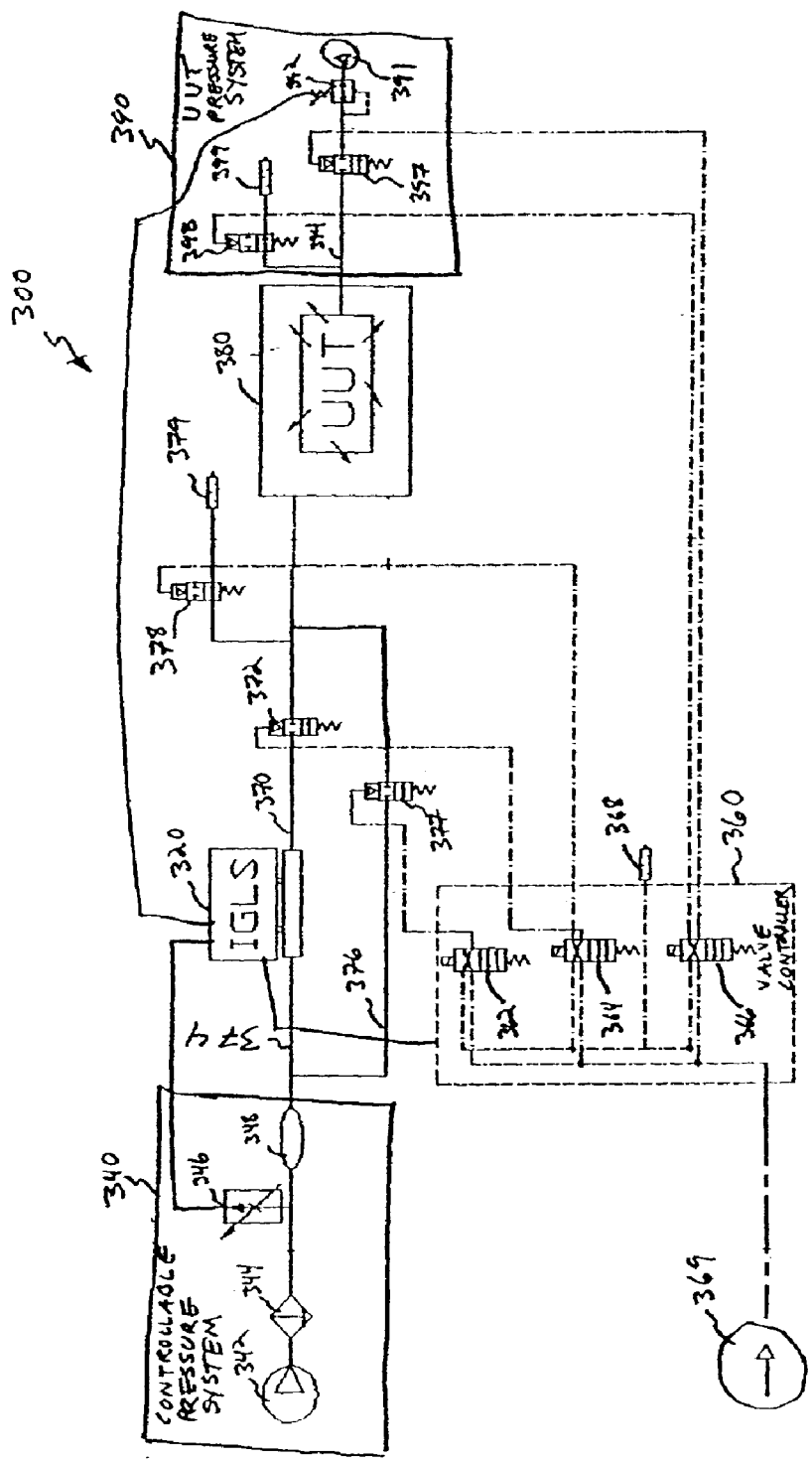
FIG. 6 is a schematic diagram of a third exemplary leak detection system.

FIG. 6 shows a schematic of a third exemplary leak detection system 300 that incorporates various features of the present invention. The third exemplary leak detection system 300 includes an intelligent gas leak sensor (IGLS) 320, a controllable pressure system 340, a valve controller 360, a test chamber 380, a UUT pressure system 390. The test chamber 380 is coupled to the IGLS 320 via an inlet conduit 370 having an inlet valve 372, and the IGLS 320 is coupled to the controllable pressure system 340 via an outlet conduit 374. The test chamber 380 is further coupled to the controllable pressure system 340 via a by-pass conduit 376 having a by-pass valve 377. Furthermore, the test chamber 380 is coupled to its surrounding environment via an exhaust valve 378 and a muffler 379 that provide a gas flow path for quickly returning the internal pressure of the test chamber 380 to atmospheric conditions.

The test chamber 380 of the leak detection system 300 is generally operable to receive a UUT, subject the UUT to a controlled pressurized environment, and permit the UUT pressure system 390 to increase the internal pressure of the UUT. To this end, the test chamber 380 may be implemented in a manner similar to the test chamber 12 depicted in FIG. 2 but with a further port through which the UUT pressure system 390 may be coupled to an opening of the UUT. In this manner, the UUT pressure system 390 may increase the internal pressure of the UUT without directly affecting the internal pressure of the test chamber 380. However, if the UUT has a leak, then the UUT pressure system 390 will affect the internal pressure of the test chamber 380 indirectly as a result of the UUT leaking mass received from the UUT pressure system 390 into the test chamber 380.

The controllable pressure system 340 is generally operable to maintain a reference pressure at a level that is controllable by the IGLS 320. To this end, the controllable pressure system 340 may be implemented in a manner similar to the controllable pressure system 340 of FIG. 10 with a vacuum pump 342, an air filter 344, a flow controller 346, and an accumulator 348 coupled to the IGLS 320 via the outlet conduit 374.

The UUT pressure system 390 is generally operable to apply a test pressure to the interior of the UUT. More specifically, certain UUT generate an elevated internal pressure during normal operation. Accordingly, these UUT need to be designed to operate at these elevated internal pressures and tested to ensure that they can operate safely at these internal operating pressures. The UUT pressure system 390 helps test that the UUT can safely operate at these internal operating pressures by subjecting the UUT to a test pressure which may be a normal operating pressure for the UUT, a maximum rated operating pressure for the UUT, or slightly above the maximum rated operating pressure for the UUT.

To this end, the UUT pressure system 390 includes a pressure source 391 coupled to the UUT via a UUT conduit 394 having a pressure regulator 392 and a charge valve 397. The charge valve 397 is operable to control flow of air through the UUT conduit 394 to the UUT. Moreover, the pressure regulator 392 is operable to regulate the pressure applied to the UUT. The UUT pressure system 390 further includes an exhaust valve 398 and a muffler 399 which are coupled to the UUT conduit 394. The exhaust valve 398 and muffler 399 provide a gas flow path for quickly returning the internal pressure of the UUT to atmospheric conditions.

The valve controller 360 is coupled to the IGLS 320, the inlet valve 372, the by-pass valve 377, the exhaust valve 378, the charge valve 397, and the exhaust valve 398. The valve controller 360 generally controls opening and closing of the inlet valve 372, the by-pass valve 377, the exhaust valve 378, the charge valve 397, and the exhaust valve 398 based upon information received from the IGLS 320. In an exemplary embodiment, the inlet valve 372, the by-pass valve 377, the exhaust valve 378, the charge valve 397, and the exhaust valve 398 are pneumatically operated. Accordingly, the valve controller 360 of the exemplary embodiment includes a first control valve 362 that pneumatically couples the an air source 369 to the by-pass valve 377 in order to pneumatically control the opening and closing of the by-pass valve 377. Furthermore, the valve controller 360 of the exemplary embodiment includes a second control valve 364 that pneumatically couples the air source 369 to the inlet valve 372 and the exhaust valve 378 in order to pneumatically control the opening and closing of the valves 372, 378. The valve controller 360 further includes a third control valve 366 that pneumatically couples the air source 369 to the charge valve 397 and the exhaust valve 398 in order to pneumatically control the opening and closing of the valves 397, 398. Furthermore, the first control valve 362, the second control valve 364, and the third control valve 366 of the valve controller 360 are pneumatically coupled to the surrounding atmosphere via a muffler 368 in order to release air in an audio-dampened manner.

The first control valve 362, the second control valve 364, and the third control valve 366 of the valve controller 360 are also electrically coupled to the IGLS 320 in order to receive electric control signals from the IGLS 320. However, the leak detection system 300 may alternatively be implemented with hydraulically or electrically controlled valves 372, 377, 378, 397, 398. Further, depending upon the input requirements of the valves 372, 377, 378, 397, 398, the IGLS 320 may be implemented to directly control the opening and closing of the valves 372, 377, 378, 397, 398 instead of controlling the opening and closing of the valves indirectly via the valve controller 360, thus eliminating the need for the valve controller 360.

The IGLS 320 is operable to control clamping of the test chamber 380, control the pressure level of the IGLS 320 by adjusting the flow controller 346, and control the inlet valve 372, the by-pass valve 377, the exhaust valve 378, the charge valve 397, and the exhaust valve 398. Moreover, the IGLS 320 is generally operable to obtain various measurements of gas flow between the test chamber 380 and the pressure system 340. In particular, the IGLS 320 is operable to obtain a measurement of the mass flow rate of the gas flow through the IGLS 320 at a particular point in time while controlling a near constant pressure within the IGLS 320 throughout a test period, calculate total mass, total volume, mass flow, and/or volumetric flow of the gas flow through the IGLS 320 during the test period, and determine whether a UUT has a leak failure based upon the calculated total mass, total volume, mass flow rate, or volumetric flow rate of the gas flow through the IGLS 320 during the test period.

Figure 7:
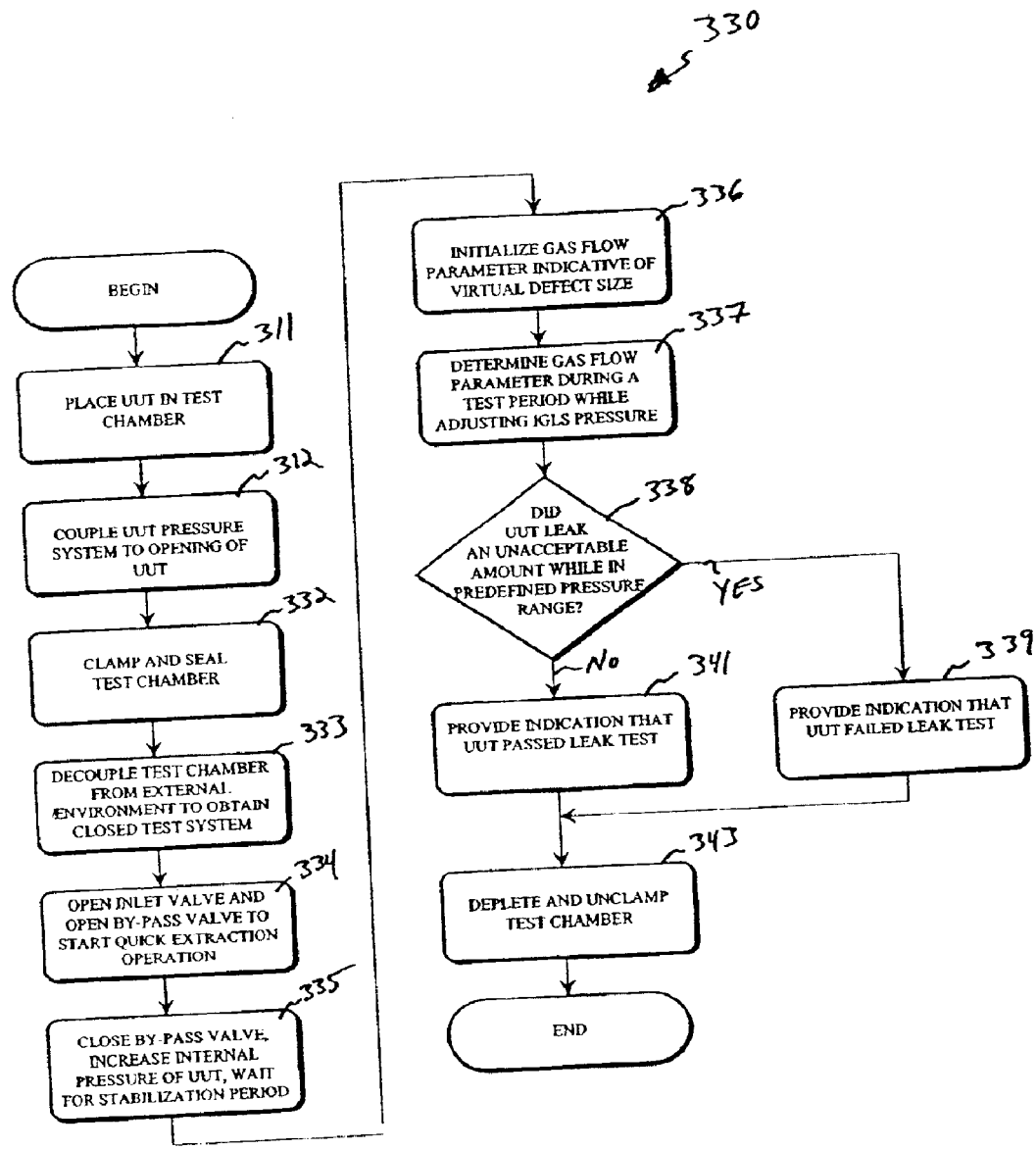
FIG. 7 is a flowchart of an exemplary leak detection method implemented by the third leak detection system shown in FIG. 6.

There is illustrated in FIG. 7 a flowchart of an exemplary leak detection method 330 implemented by the leak detection 300. In particular, the leak detection method 330 begins with placing the UUT into the test chamber 380 in step 311, and coupling the UUT pressure system 390 to an opening of the UUT in step 312.

Then in step 332, the IGLS 320 generates a clamp signal that causes the test chamber 380 to seal. Alternatively, a person could manually seal the test chamber 380. After the test chamber 380 is sealed, the IGLS 120 in step 333 generates one or more control signals that cause the exhaust valve 378 to operably decouple the test chamber 380 from the surrounding environment and couple the outlet port of the test chamber 380 to the pressure system 340 thus creating a closed test system.

In the exemplary embodiment, the IGLS 320 in step 334 generates one or more control signals that cause the inlet valve 372 to open and the by-pass valve 377 to open for a predetermined quick extraction period (e.g. 3 to 5 seconds). As result of opening the by-pass valve 377, the pressure system 340 via the by-pass conduit 376 quickly extracts mass from the test chamber 380 to quickly bring the internal pressure of the test chamber 380 closer to the reference pressure maintained by the pressure system 340. In the exemplary embodiment, the IGLS 320 provides a more restrictive gas flow path between the test chamber 380 and the pressure system 340 than the gas flow path provided by the by-pass conduit 376. Accordingly, opening the by-pass valve 377 causes the internal pressure of the test chamber 380 to more quickly approach the reference pressure maintained by the pressure system 340 and reduce the overall time required to test the UUT. In an exemplary embodiment, the predetermined quick extraction period is determined during a calibration process for the type of test chamber 380 to be used and the type of product to be tested. From the calibration process, the exemplary embodiment determines a quick extraction period that is sufficient for the pressure system 340 to bring the internal pressure of the test chamber 380 near the reference pressure maintained by the pressure system 340.

After performing the quick extraction operation in step 334, the IGLS 320 in step 335 generates one or more control signals that cause the by-pass valve 377 to close and then waits for a predetermined stabilization period (e.g. 0.8 seconds). As a result of closing the by-pass valve 377, gas flow between the test chamber 380 and the pressure system 340 is restricted to pass through the IGLS 320. Furthermore, the IGLS 320 in step 335 increases the internal pressure of the UUT to the test pressure. To this end, the IGLS 320 generates one or more control signals which cause the exhaust valve 398 of the UUT pressure system 390 to close in order decouple the opening of the UUT from the surrounding atmosphere and cause the charge valve 397 of the UUT pressure system 390 to open in order to couple the air source 391 to the UUT. The IGLS 320 further adjusts the pressure regulator 392 in order to increase the internal pressure of the UUT to the desired test pressure. Alternatively, the pressure regulator 392 may be manually adjusted in order to increase the internal pressure of the UUT to the desired test pressure.

During step 335 and the following test period, the IGLS 320 further monitors the static pressure sensed by the static pressure sensor 90, 590 (FIGS. 10 and 16) in order to determine whether the UUT has had a gross failure as a result of increasing its internal pressure. More specifically, the IGLS 320 in an exemplary embodiment determines that the UUT has had a gross failure if the static pressure of the IGLS 320 increases by more than a threshold level over a predetermined period of time. If the IGLS 320 makes such a determination, then the IGLS 320 aborts the test, generates one or more control signals that open the exhaust valves 379, 398, and provides an indication that the UUT failed the leak test.

The IGLS 320 then in step 336 initializes a gas flow parameter (e.g. total mass value, total volume value, mass flow rate, volumetric flow rate) indicative of a virtual defect size of the UUT. In particular, the IGLS 320 in an exemplary embodiment initializes the gas flow parameter to a value of zero.

The IGLS 320 in step 337 calculates the gas flow parameter of the gas flow through the IGLS 320 during a predetermined test period (e.g. 5–10 seconds) and continually adjusts the flow controller 346 in order to maintain a programmable pressure within the IGLS 320. In particular, the IGLS 320, in an exemplary embodiment, periodically determines the pressure in the IGLS 320 and generates one or more control signals which cause the flow controller 346 of the controllable pressure system 340 to adjust the pressure applied to the IGLS 320 by an amount needed to maintain the desired pressure in the IGLS 320. By adjusting the pressure within the IGLS 320, the IGLS 320 may more quickly determine whether a given UUT leaked an acceptable or an unacceptable amount.

Further, in order to calculate the gas flow parameter, the IGLS 320 in an exemplary embodiment generates at periodic intervals a mass flow rate value $(dM/dt)_n$ representative of the mass flow rate of gas through the IGLS 320 during an interval n and updates the total mass value M after each periodic interval n by adding to the current total mass value M, the product of the mass flow rate value $(dM/dt)_n$ times the duration of the associated interval n. Alternatively, or in addition to, the IGLS 320 generates at periodic intervals a volumetric flow rate value $(dQ/dt)_n$ representative of the volumetric flow rate of the gas through the IGLS 320 during an interval n and updates a total volume value V after each periodic interval n by adding to the current total volume value V, the product of the volumetric flow rate value $(dQ/dt)_n$ times the duration of the associated interval n.

The IGLS 320 then in step 338 determines based upon the obtained gas flow parameter (e.g. total mass, total volume, mass flow rate at a particular point, volumetric flow rate at a particular point) for the gas flow through the IGLS 320 during the test period whether the UUT leaked an unacceptable amount during the test period. More specifically, the IGLS 320 in an exemplary embodiment compares the total mass value M for the gas flow during the test period to a predetermined threshold level and determines that the UUT leaked an unacceptable amount if the total mass has a predetermined relationship to the threshold level. For example, the pressure system 340 in an exemplary embodiment applies a reference pressure that is below atmospheric conditions to the test chamber 380 and the IGLS 320 determines that the UUT leaked an unacceptable amount if the total mass extracted during the test period is greater than the predetermined threshold. In an alternative embodiment, the IGLS 320 compares the total volume value V for the gas flow during the test period to a predetermined threshold level and determines that the UUT leaked an unacceptable amount if the total volume has a predetermined relationship to (e.g. greater than) the threshold level. Similarly, the IGLS 320 in yet another exemplary embodiment compares the total mass flow rate for the gas flow obtained at a predetermined point during the test period to a predetermined threshold level and determines that the UUT leaked an unacceptable amount if the total mass flow rate has a predetermined relationship to (e.g. greater than) the threshold level.

If the IGLS 320 in step 338 determines that the UUT leaked an unacceptable amount during the test period, then the IGLS 320 in step 339 provides an indication that the UUT failed the leak test. Conversely, if the IGLS 320 in step 338 determines that the UUT did not leak an unacceptable amount during the test period, then the IGLS 320 in step 341 provides an indication that the sealed UUT passed the leak test. The IGLS 320 may provide the above status indications in many known manners such as distinguishing audible tones, visible lights, textual displays, and/or electronic signals. After indicating the status of the UUT, the IGLS 320 generates one or more control signals in step 343 that cause the exhaust valve 378 to open and deplete the test chamber 380 and the exhaust valve 399 to open and deplete the internal pressure of the UUT. Alternatively, a person could manually deplete the test chamber 380.

Figure 8:
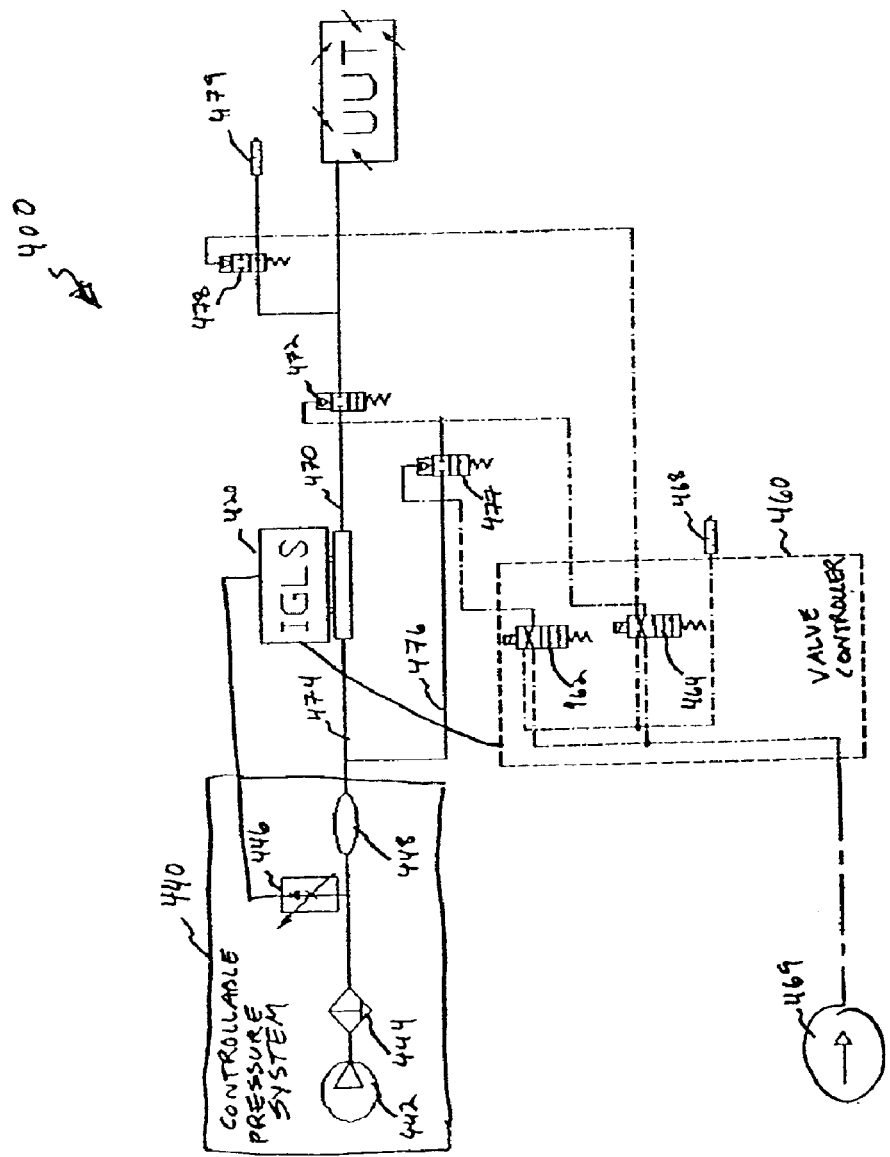
FIG. 8 is a schematic diagram of a fourth exemplary leak detection system.

FIG. 8 shows a schematic of a fourth exemplary leak detection system 400 that incorporates various features of the present invention. The fourth exemplary leak detection system 400 includes an intelligent gas leak sensor (IGLS) 420, a controllable pressure system 440, and a valve controller 460. The interior of the UUT is pneumatically coupled to the IGLS 420 via an opening of the UUT and an inlet conduit 470 comprising an inlet valve 472, and the IGLS 420 is coupled to the controllable pressure system 440 via an outlet conduit 474. Furthermore, the inlet conduit 470 is coupled to the surrounding environment via an exhaust valve 478 and muffler 479 that provide a gas flow path for quickly returning the internal pressure of the UUT to atmospheric conditions.

The controllable pressure system 440 is generally operable to maintain a reference pressure at a level that is controllable by the IGLS 420. To this end, the controllable pressure system 440 may be implemented in a manner similar to the controllable pressure system 240 of FIG. 4 with a vacuum pump 442, an air filter 444, a flow controller 446, and an accumulator 448 that are coupled to the IGLS 420 via the outlet conduit 474.

The valve controller 460 is coupled to the IGLS 420, the inlet valve 472, the by-pass valve 477, and the exhaust valve 478. The valve controller 460 generally controls opening and closing of the inlet valve 472, the by-pass valve 477, and the exhaust valve 478 based upon information received from the IGLS 420. In an exemplary embodiment, the inlet valve 472, the by-pass valve 477, and the exhaust valve 478 are pneumatically operated. Accordingly, the valve controller 460 of the exemplary embodiment includes a first control valve 462, a second control valve 464, and a muffler 469 which operate in a manner similar to the valve controller 260 of FIG. 12.

The IGLS 420 is operable to control the pressure level of the IGLS 420 by adjusting the flow controller 446, and control the inlet valve 472, the by-pass valve 477, and the exhaust valve 478. Moreover, the IGLS 420 is generally operable to obtain various measurements of gas flow between the UUT and the pressure system 440. In particular, the IGLS 420 is operable to obtain a measurement of the mass flow rate of the gas flow through the IGLS 420 at a particular point in time while controlling a near constant pressure within the IGLS 420 throughout a test period, calculate total mass, total volume, mass flow, and/or volumetric flow of the gas flow through the IGLS 420 during the test period, and determine whether the UUT has a leak failure based upon the calculated total mass, total volume, mass flow rate, or volumetric flow rate of the gas flow through the IGLS 420 during the test period.

Figure 9:
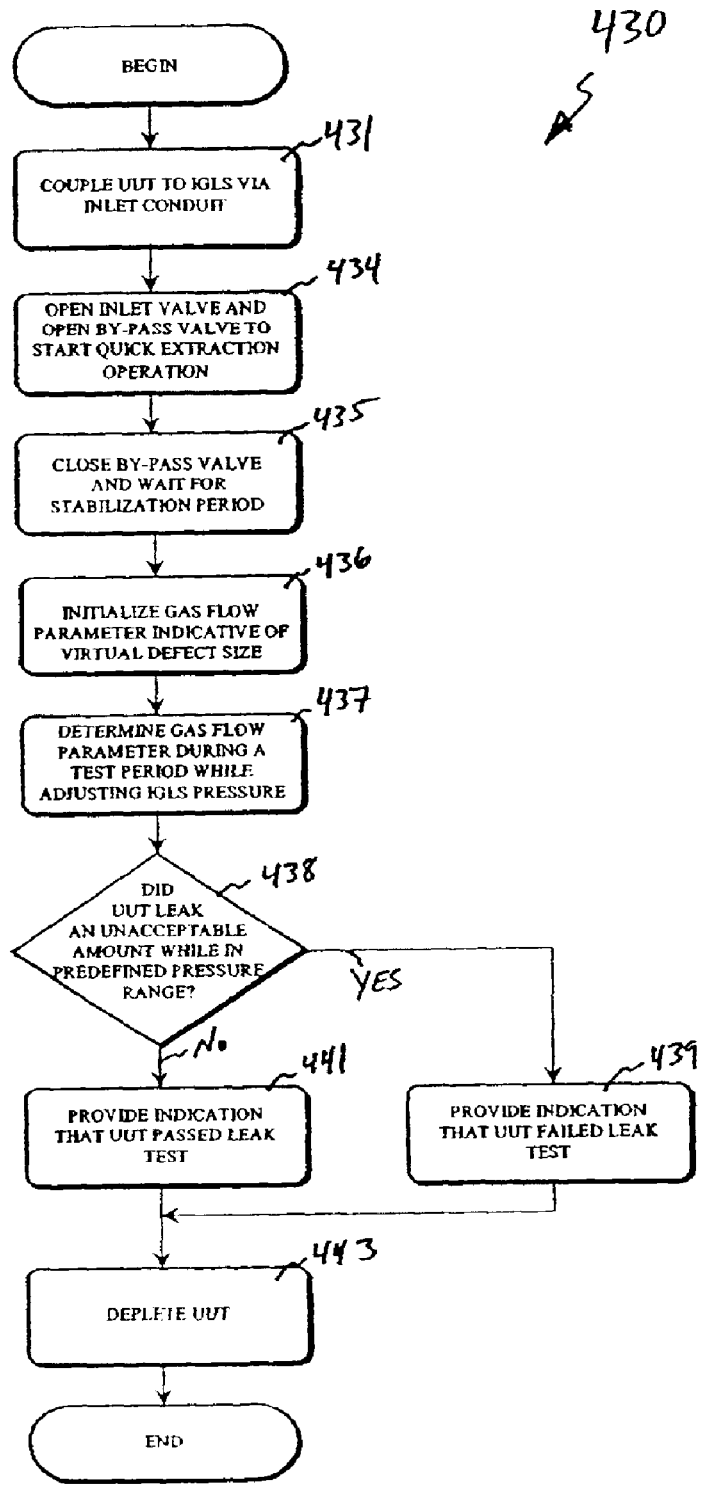
FIG. 9 is a flowchart of an exemplary leak detection method implemented by the fourth leak detection system shown in FIG. 8.

There is illustrated in FIG. 9 a flowchart of an exemplary leak detection method 430 implemented by the leak detection system 400. In particular, the leak detection method 430 begins in step 431 by coupling the UUT to the IGLS 420. More specifically, the inlet conduit 470 of the leak detection system 400 is coupled to an opening of the UUT in order to pneumatically couple the interior of the UUT to the IGLS 420.

In the exemplary embodiment, the IGLS 420 in step 434 generates one or more control signals that cause the inlet valve 472 to open and the by-pass valve 477 to open for a predetermined quick extraction period (e.g. 3 to 5 seconds). As result of opening the by-pass valve 477, the pressure system 440 via the by-pass conduit 476 quickly extracts mass from the UUT to quickly bring the internal pressure of the UUT closer to the reference pressure maintained by the pressure system 440. In the exemplary embodiment, the IGLS 420 provides a more restrictive gas flow path between the test chamber 480 and the pressure system 440 than the gas flow path provided by the by-pass conduit 476. Accordingly, opening the by-pass valve 477 causes the internal pressure of the test chamber 480 to more quickly approach the reference pressure maintained by the pressure system 440 and reduce the overall time required to test the UUT. In an exemplary embodiment, the predetermined quick extraction period is determined during a calibration process for the type of unit to be tested. From the calibration process, the exemplary embodiment determines a quick extraction period that is sufficient for the pressure system 440 to bring the internal pressure of the test chamber 480 near the reference pressure maintained by the pressure system 440.

After performing the quick extraction operation in step 434, the IGLS 420 in step 435 generates one or more control signals that cause the by-pass valve 477 to close, and then waits for a predetermined stabilization period (e.g. 0.8 seconds). As a result of closing the by-pass valve 477, gas flow between the UUT and the pressure system 440 is restricted to pass through the IGLS 420. The IGLS 420 in step 436 initializes a gas flow parameter (e.g. total mass value, total volume value, mass flow value). In particular, the IGLS 420 in an exemplary embodiment initializes the gas flow parameter to a value of zero.

The IGLS 420 in step 437 calculates a gas flow parameter of the gas flow through the IGLS 420 during a predetermined test period (e.g. 5–10 seconds) and continually adjusts the flow controller 446 in order to maintain a programmable pressure within the IGLS 420. In particular, the IGLS 420, in an exemplary embodiment, periodically determines the pressure in the IGLS 420 and generates one or more control signals which cause the flow controller 446 of the controllable pressure system 440 to adjust the pressure applied to the IGLS 420 by an amount needed to maintain the desired pressure in the IGLS 420. By adjusting the pressure within the IGLS 420, the IGLS 420 may more quickly determine whether a given UUT leaked an acceptable or an unacceptable amount.

Further, in order to calculate the gas flow parameter, the IGLS 420 in an exemplary embodiment generates at periodic intervals a mass flow rate value $(dM/dt)_n$ representative of the mass flow rate of gas through the IGLS 420 during an interval n and updates the total mass value M after each periodic interval n by adding to the current total mass value M, the product of the mass flow rate value $(dM/dt)_n$ times the duration of the associated interval n. Alternatively, or in addition to, the IGLS 420 generates at periodic intervals a volumetric flow rate value $(dQ/dt)_n$ representative of the volumetric flow rate of the gas through the IGLS 420 during an interval n and updates a total volume value V after each periodic interval n by adding to the current total volume value V, the product of the volumetric flow rate value $(dQ/dt)_n$ times the duration of the associated interval n.

The IGLS 420 then in step 438 determines based upon the obtained gas flow parameter (e.g. total mass, total volume, mass flow rate at a particular point, volumetric flow rate at a particular point) for the gas flow through the IGLS 420 during the test period whether the UUT leaked an unacceptable amount during the test period. More specifically, the IGLS 420 in an exemplary embodiment compares the total mass value M for the gas flow during the test period to a predetermined threshold level and determines that the UUT leaked an unacceptable amount if the total mass has a predetermined relationship to the threshold level. For example, the pressure system 440 in an exemplary embodiment applies a reference pressure that is below atmospheric conditions to the test chamber 480 and the IGLS 420 determines that the UUT leaked an unacceptable amount if the total mass extracted during the test period is greater than the predetermined threshold. In an alternative embodiment, the IGLS 420 compares the total volume value V for the gas flow during the test period to a predetermined threshold level and determines that the UUT leaked an unacceptable amount if the total volume has a predetermined relationship to (e.g. greater than) the threshold level. Similarly, the IGLS 420 in yet another exemplary embodiment compares the total mass flow rate for the gas flow obtained at a predetermined point during the test period to a predetermined threshold level and determines that the UUT leaked an unacceptable amount if the total mass flow rate has a predetermined relationship to (e.g. greater than) the threshold level.

If the IGLS 420 in step 438 determines that the UUT leaked an unacceptable amount during the test period, then the IGLS 420 in step 439 provides an indication that the UUT failed the leak test. Conversely, if the IGLS 420 in step 438 determines that the UUT did not leak an unacceptable amount during the test period, then the IGLS 420 in step 441 provides an indication that the sealed UUT passed the leak test. The IGLS 420 may provide the above status indications in many known manners such as distinguishing audible tones, visible lights, textual displays, and/or electronic signals. After indicating the status of the UUT, the IGLS 420 generates one or more control signals in step 443 that cause the exhaust valve 478 to open and deplete the internal pressure of the UUT. Alternatively, a person could manually activate the exhaust valve 478 to deplete the internal pressure of the UUT.

Figure 10:
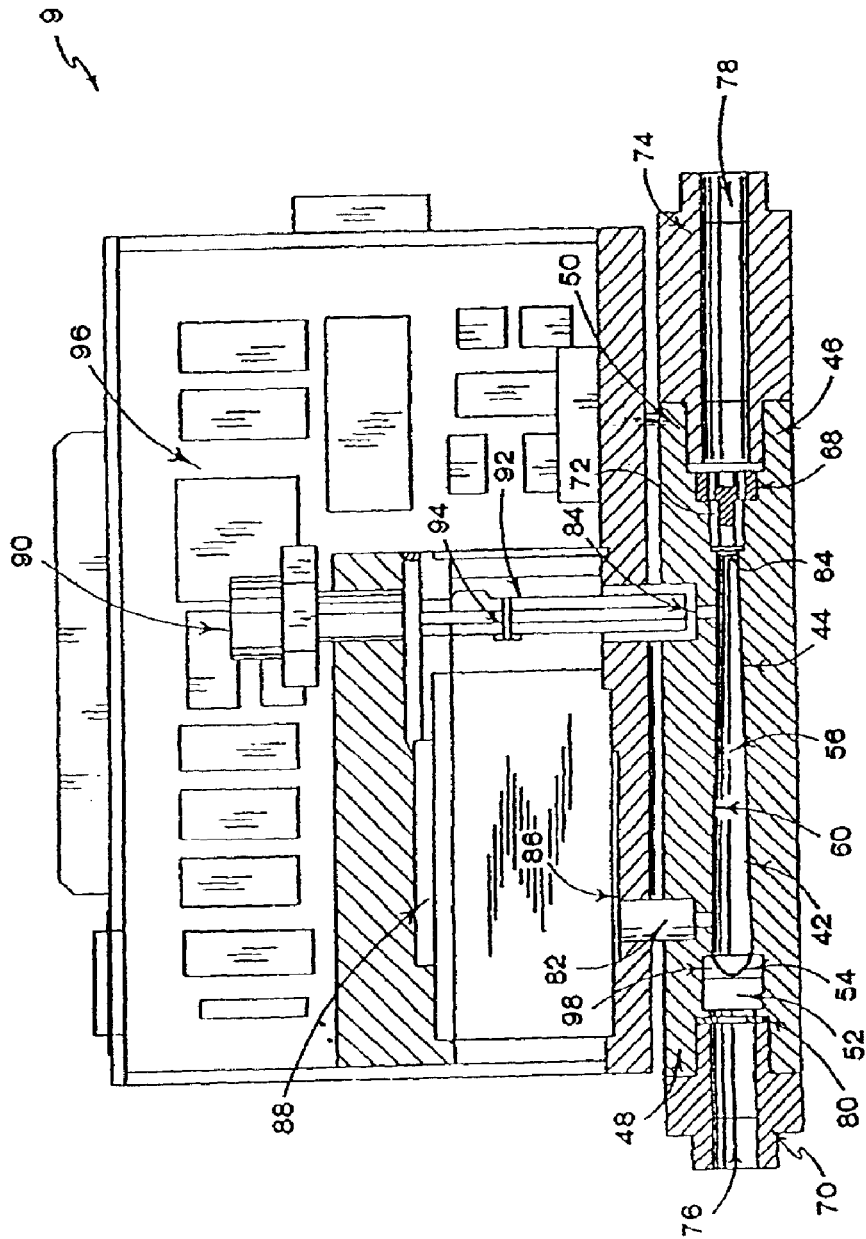
FIG. 10 is a section diagram of a first IGLS design for the intelligent gas leak sensor of the leak detection systems shown in FIGS. 1, 4, 6, and 8.

An exemplary first IGLS design suitable for implementing the IGLS 9 of FIG. 1, the IGLS 220 of FIG. 4, the IGLS 320 of FIG. 6, and/or the IGLS 420 of FIG. 8 is depicted in FIG. 10. As depicted, the first IGLS design includes a body 46 made of 316 stainless steel or other similar material for improved tolerance characteristics, machining capabilities, temperature stability and increased tolerance to various gases. The body 46 has a first end portion 48 and a second end portion 50. The external profile of the body 46 is cylindrical and varies in size in correlation to the flow rate of the gas. A conical-shaped center shaft 42 is inserted into a precisely machined conical bore 44 within the body 46. The center shaft 42 comprises a cylindrical portion 52, a chamfer 54, and a conical portion 56.

Figure 11:
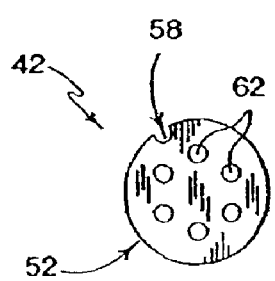
FIG. 11 is an end view of the cylindrical portion of the center shaft of the intelligent gas leak sensors shown in FIGS. 1, 4, 6, and 8.

The cylindrical portion 52, better illustrated in FIG. 11, also contains a first machined bore 58 for receipt of a dowel pin (not shown) which allows the dowel pin to be press fit into the first machined bore 58. The body 46 contains a second machined bore (not shown) which allows the dowel pin to pass through the second machined bore forming a keyway such that the center shaft 42 can be removed and cleaned without the need for recalibration, i.e. the center shaft 42 can be inserted into its original position in terms of orientation.

Preferably the conical portion 56 of the center shaft 42 shall have a total angle between 1 degree and 10 degrees with an optimum angle of 2 to 6 degrees. The location of the center shaft 42 within the bore 44 is positioned in part by the use of a spring washer (not shown) and forms a laminar flow gap 60 between the inner portion of the bore 44 and the conical portion 56 of the center shaft 42. The laminar flow gap 60 is uniform along the length of the conical portion 56 of the center shaft 42 such that a laminar flow of gas through the laminar flow gap 60 results. Laminar flow of gas through the laminar flow gap 60 provides more accurate pressure measurements and flow calculations than would result from more turbulent flow. With the conical shape and the ability to adjust the center shaft 42 for calibration, the flow can be accelerated or decelerated to obtain a polynomial relationship for leak test. The measurement taken is amplified by the use of typical amplifiers on the market to improve the accuracy of the readings.

Figure 12:
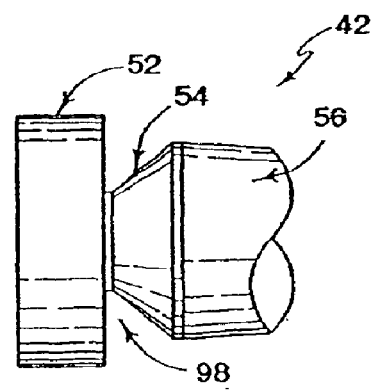
FIG. 12 is an detail view of the cylindrical portion and chamfer of the center shaft the intelligent gas leak sensors shown in FIG. 1, 4, 6, and 8.

The center shaft 42 has a cylindrical portion 52 precisely located in bore 44 to support one end of the conical portion 56 of the center shaft 42. Further, as shown in the end view of FIG. 11, the exemplary cylindrical portion 52 comprises a first machined bore 58 for receipt of a dowel pin and a plurality of holes 62 with the exemplary embodiment containing six (6) holes 62. Moreover, as shown in FIG. 12, the holes 62 are drilled through the round cylindrical portion 52 of the center shaft 42, such that an opening or equalization chamber 98 is created due to the chamfer 54 of the center shaft 42 immediately after the cylindrical portion 52 of the center shaft 42 that allows the gas to flow in an orderly fashion to the laminar flow gap 60 created by the center shaft 42 and the conical bore 44. The gas flow enters the holes 62 in the cylindrical portion 52 and after striking a chamfer 54, the gas flow is directed toward the conical portion 56 of the center shaft 42. The gas then flows along the conical portion 56 within the laminar flow gap 60 created by the conical bore 44 and the outer surface of the conical portion 56 of the center shaft 42 as illustrated in FIG. 15.

Figure 13:
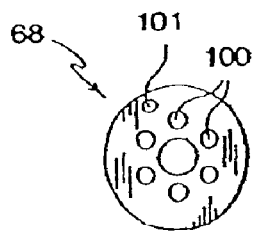
FIG. 13 is an end view of the spacer of the intelligent gas leak sensors shown in FIGS. 1, 4, 6, and 8.
Figure 14:
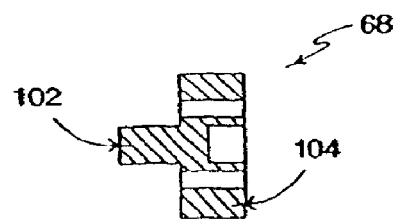
FIG. 14 is a side view of the spacer shown in FIG. 13.

The outlet end 64 of the center shaft 42 is reduced to allow flow to enter outlet ports 72 drilled into the second end portion 50 of the body 46. Moreover, the outlet end 64 of the center shaft 42 is configured to engage with a receiving portion of a spacer 68. As shown in FIG. 15, a male portion of the outlet end 64 in an exemplary embodiment engages a female portion of the spacer 68. However, the outlet end 64 could be implemented with a female portion that engages a male portion of the spacer 68, or the outlet end 64 and the spacer 68 may be configured with other engagement members. The 6 outlet ports 72 in the exemplary embodiment are aligned with six (6) holes 100 in a spacer 68 to allow the gas to flow through an outlet end cap 74. The body 46 has the same number of outlet ports 72 drilled in the second end portion 50 of the body 46 to direct the gas flow from the center shaft 42 to the spacer 68. As shown in FIGS. 13 and 14, the spacer holes 100 align with the outlet ports 72 drilled in the second end portion 50 of the body 46 which allows the gas to pass through to the end cap 74. The spacer 68 further comprises a pin 101 on its outer periphery for insertion within a hole in the body 46 to allow for precise repeatability when the components are removed and then reassembled for maintenance cleaning. Moreover, as shown in the side view of FIG. 14, the spacer 68 further comprises a small cylindrical portion 102 that protrudes from a larger cylindrical portion 104. The larger cylindrical portion 104 engages the outlet end 64 of the center shaft 42 to hold the center shaft 42 in place.

Figure 15:
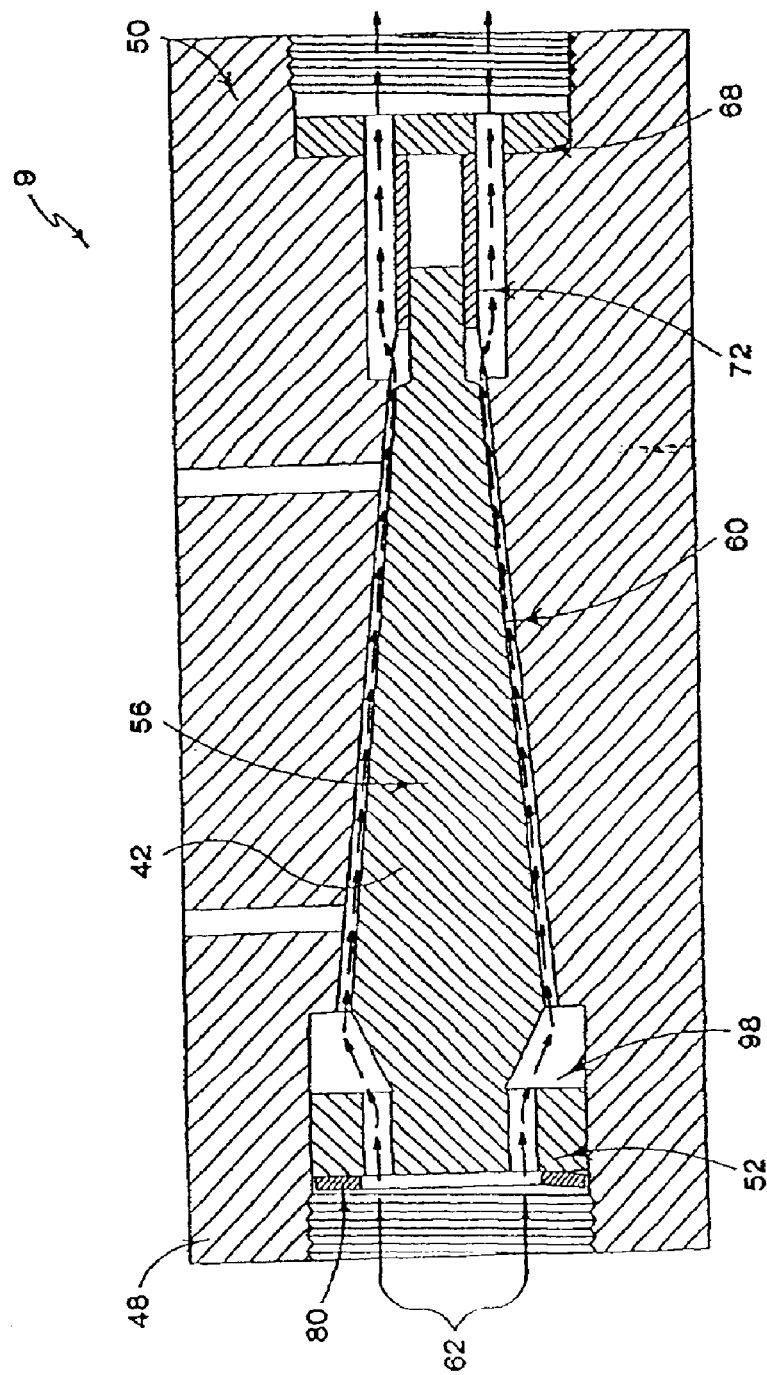
FIG. 15 is a section view of the flow pattern of gas through intelligent gas leak sensors implementing the first IGLS design of FIG. 10.

A section view of the center shaft 42 is shown in FIG. 15 which illustrates the flow pattern of the device in the leak test mode. The flow enters the first end portion 48 of the body 46 or the end in which the center shaft 42 is larger. The gas flows through the plurality of holes 62 in the cylindrical portion 52 of the center shaft 42, which in this instance is 6 holes and enters an equalization chamber 98 formed by the external shape of the center shaft 42 and the internal bore of the center bore 44. The gas then flows up one side of the equalization chamber 98 and enters the laminar flow gap 60 between the outer portion of the center shaft 42 and the inner portion of the center bore 44. The laminar flow gap 60 is uniform for the length of the conical portion 56 of the center shaft 42 until the gas reaches the outlet ports 72 for the device. The gas flows through the 6 outlet ports 72 drilled in the body 46 and through 6 holes in the spacer 68. From there the gas flows through the outlet end cap (not shown).

Referring back to FIG. 10, a first and second end cap 70 and 74, respectively, are attached to the first and second end portions 48 and 50, respectively, of the body 46 to enclose the conical bore 44 and center shaft 42 within the body 46. During exemplary operation, the first end cap 70 functions as an inlet cap and the second end cap 74 functions as an outlet cap. The inlet and outlet end caps 70 and 74, respectively, are attached to the body 46 using typical fasteners available on the market, such as screws rotated into threaded holes in the body 46. The center of the first and second end caps 70 and 74, respectively, contain a first and second bore 76 and 78 to allow the gas to flow through each of the first and second end caps, 70 and 74, respectively.

The conical portion 56 of the center shaft 42 allows adjustment of the maximum flow rate through the IGLS by adjusting the position of the center shaft 42 within the conical bore 44 and/or by matching the conical portion 56 of the center shaft 42 with the conical bore 44. Cone matching allows for better accuracy than cylindrical shapes due to accuracy effects caused by imperfections on the cylindrical surface and consequently, the flow rate can be adjusted to a point just above the value desired and more accurate leak detection is attained.

To this end, the center shaft 42 is adjusted within the bore using the spacer 68 machined to a precise dimension such that the spacer 68 located at the outlet end 64 of the center shaft 42 and the spring washer 80 located at the cylindrical portion 52 of the center shaft 42 position the center shaft 42 and hold it in place in a calibrated position. This design provides a unit where the calibration remains constant and can be modified with a spacer 68 of a different dimension.

Alternatively, the center shaft 42 could be calibrated using an adjusting screw or a calibrated locating cylinder at the second end portion 50 of the body 46 or the narrow end of the conical portion 56 of the center shaft 42. The spacer 68 is threaded and the adjusting screw can be adjusted by rotating the adjusting screw clockwise or counterclockwise to position the center shaft 42 according to calibration measurements. The adjusting screw and a spring washer 80 located at the cylindrical portion 52 of the center shaft 42 apply the appropriate forces to locate the center shaft 42 and hold it in place to provide for a uniform but adjustable gap 60 between the conical portion 56 of the center shaft 42 and the surface of the conical bore 44 within the body 46.

A first receiving port 82 and a second receiving port 84 are drilled in the body 46 to monitor the pressure differences in the laminar flow around the conical center shaft 42. The first receiving 82 port is drilled into the top side of the body 46 and extends from the top side of the body 46 to the conical bore 44 within the body 46. The first receiving port 82 can be located anywhere along the conical bore 44 where L/h>50. In this equation, the length from the edge of the conical portion 56 of the center shaft 42 to the location of the first receiving port 82 is "L" and the height between the outer wall of the conical portion 56 of the center shaft 42 and the inner wall of the machined bore 58 is "h" or the height of the laminar flow gas.

The second receiving port 84 is also drilled in the top side of the body 46 and is located downstream of the first receiving port 82 or toward the smaller end of the conical center shaft 42. The second receiving port 84 also extends from the top side of the body 46 to the conical bore 44. The second receiving port 84 can be located at a second position anywhere between the first receiving port 82 and the outlet end 64 of the center shaft 42 but it is preferable for the first and second receiving ports, 82 and 84, respectively, to be separated by a distance sufficient to maintain a constant differential pressure per inch of flow length which is usually 2 to 3 inches.

The positions of the first receiving port 82 and the second receiving port 84 are designed to be located sufficiently within the laminar flow gap 60 such that the laminar flow of the gas is fully developed and little or no turbulence in the gas flow exists. Gas enters the first receiving port 82 and flows to a first pressure chamber or first diaphragm 86 with a movable outer wall. Gas also enters the second receiving port 84 and flows through the columnar housing 92 to a second pressure chamber or second diaphragm 88 also with a movable outer wall. The force that the first pressure chamber 86 exerts against the second pressure chamber 88 measures the relative displacement of the first and second diaphragms, 86 and 88 respectively, and a value for the differential pressure can be determined. The first and second diaphragms, 86 and 88, respectively, are located off center from the body 46 and center shaft 42 to minimize volumetric changes and increase response time.

The first receiving port 82, the second receiving port 84, the first diaphragm 86 and the second diaphragm 88 of the exemplary embodiment define a first pressure sensor or differential pressure sensor that generates a differential pressure signal indicative of the sensed differential pressure. This type of differential pressure measurement is termed capacitance technology and is commonly known in the industry. Moreover, the first receiving port 82, the second receiving port 84, the first diaphragm 86 and the second diaphragm 88 of the exemplary embodiment form a differential pressure sensor that is operable to generate the differential pressure signal such that the differential pressure signal is linear with respect to the differential pressure sensed between the first receiving port 82 and the second receiving port 84. More specifically, the differential pressure sensor of the exemplary embodiment is operable to sense differential pressures from 0 KPa to 0.0249 KPa, 0.0747 KPa, 0.125 KPa, 0.249 KPa, 1.25 KPa, 2.49 KPa, or 6.9 KPa full scale and to generate a linear DC differential pressure signal between 0 volts and 5 volts full scale in response thereto.

The second pressure sensor or static pressure sensor 90 of the exemplary first design is located on the top of the columnar housing 92 to measure static pressure within the laminar flow gap 60. In the exemplary embodiment, the static pressure sensor 90 is exposed to the same gas flow as that of the second diaphragm 88. In an exemplary embodiment, the static pressure sensor 90 is operable to generate the static pressure signal such that the static pressure signal is linear with respect to the static pressure sensed at the second port 84. More specifically, the static pressure sensor 90 of the exemplary embodiment is operable to sense static pressures from 0 KPa to 103.425 KPa, 206.85 KPa, 689.5 KPa, or 13,790 KPa full scale and to generate a linear DC static pressure signal between 0 volts and 5 volts full scale in response thereto.

A temperature sensor 94 of the exemplary first design is located on the side of the columnar housing 92 to measure the temperature within the columnar housing 92. The temperature sensor 94 is attached to a portion of the columnar housing 92 which has been machined to a point in which the air temperature within the columnar housing 92 is the same as that of the thin, machined columnar housing 92 wall. The temperature sensor 94 of the exemplary first design comprises a typical RTD type sensor which are commonly used in the industry. The columnar housing 92 has tolerance expansion capabilities by positioning an o-ring at each end of the columnar housing 92. The o-rings seal the columnar housing 92 for accurate measurement but also allow the columnar housing 92 to expand or contract to allow for temperature differences and dimensional tolerances. In an exemplary embodiment, the temperature sensor 94 is operable to sense temperatures between 273 K and 353 K and respectively generate a linear DC temperature signal between 0 volts and 5 volts in response thereto.

A microcontroller 96 is connected to the sensors to record all the measurements, provide mathematical correlation polynomial equations, perform temperature and pressure compensation, display readings on an LCD display including pressure, flow, total mass, and other messages, control the valve sequence for leak test purposes using digital I/O signals, communicate to a personal computer for setup and data acquisition, provide pressure/flow control and send analog signals to remote devices, such as personal computers. The microcontroller 96 can take such measurements and perform such calculations for gas flowing in either direction within the body. Further, the microcontroller 96 can measure acceleration and deceleration for sensitivity and repeatability of the calculations. In an exemplary embodiment, the microcontroller 96 includes one or more A/D converters which receive the differential pressure signal, the static pressure signal, and temperature signal and convert them to a digital sample or count. The microcontroller 96 may alternatively be implemented without an A/D converter if the differential pressure sensor, the static pressure sensor 90 and the temperature sensor 94 are implemented to output digital signals instead of analog signals.

The microcontroller 96, the differential pressure sensor and the static pressure sensor 90 of the exemplary are located within a housing or enclosure to protect the components from damage and to make the entire piece of equipment more attractive. On the outside of the enclosure an LCD display is mounted to display various messages to inform the user of measurement results and other messages. Also located on the outside of the enclosure is a start/stop button to start or stop a particular test.

Figure 16:
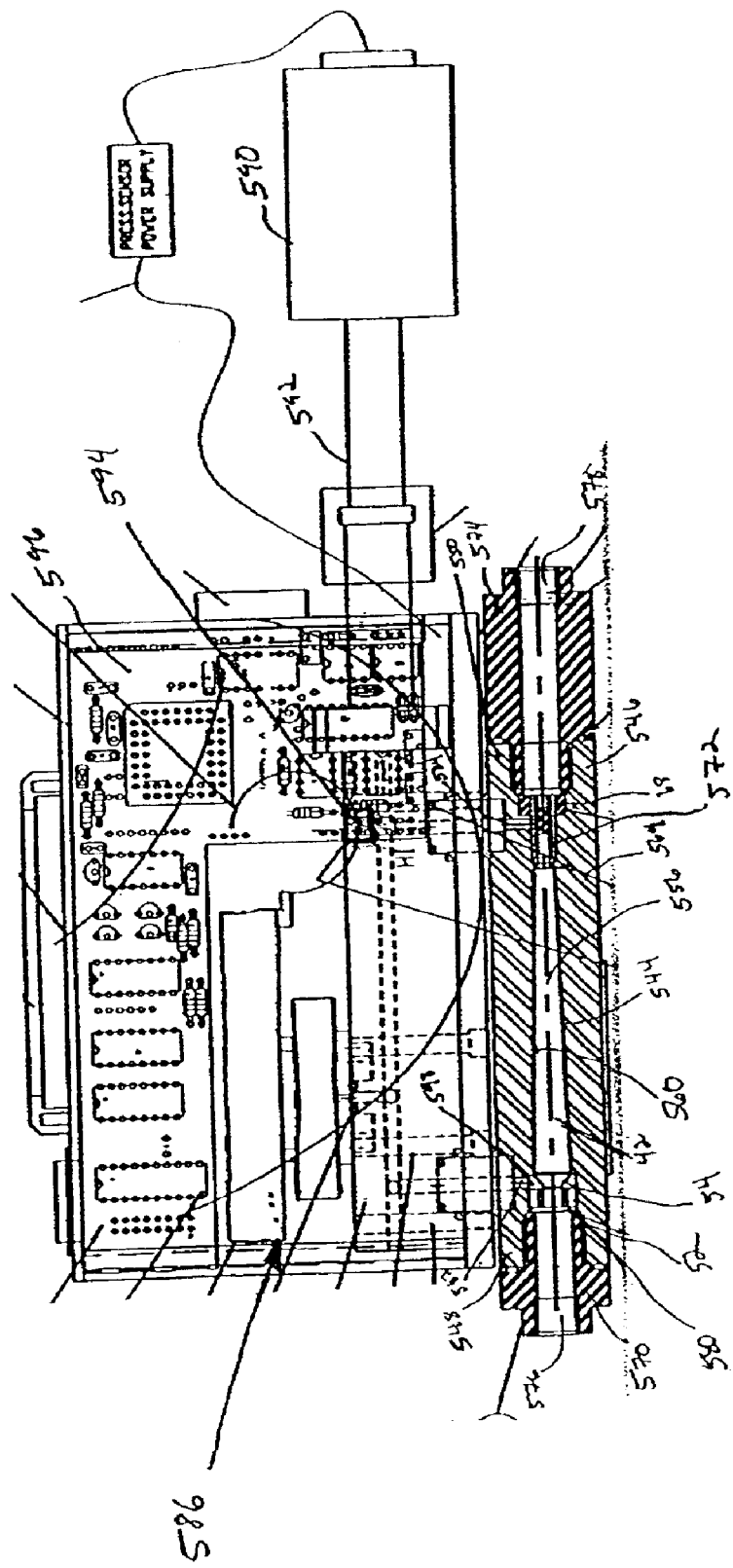
FIG. 16 is a section diagram of a second IGLS design for the intelligent gas leak sensor of the leak detection systems shown in FIGS. 1, 4, 6, and 8.
Figure 17:
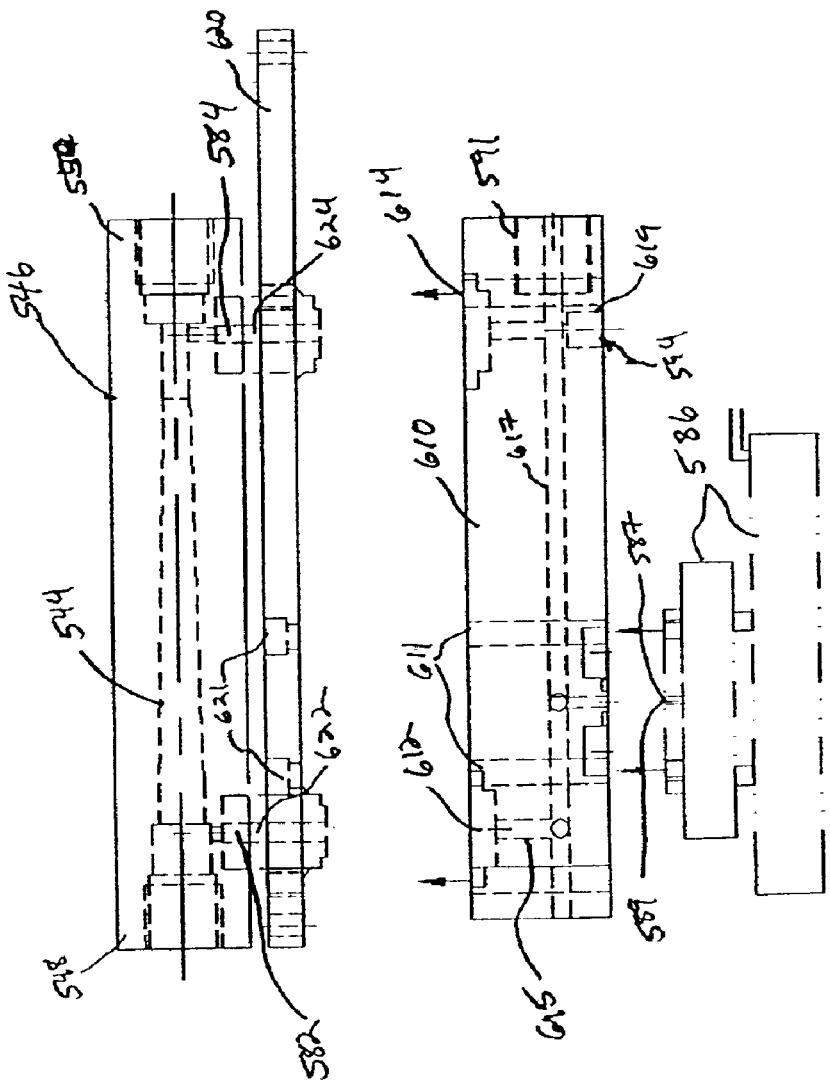
FIG. 17 is a section diagram of the body and manifold of the intelligent leak sensor shown in FIG. 16.
Figure 18:
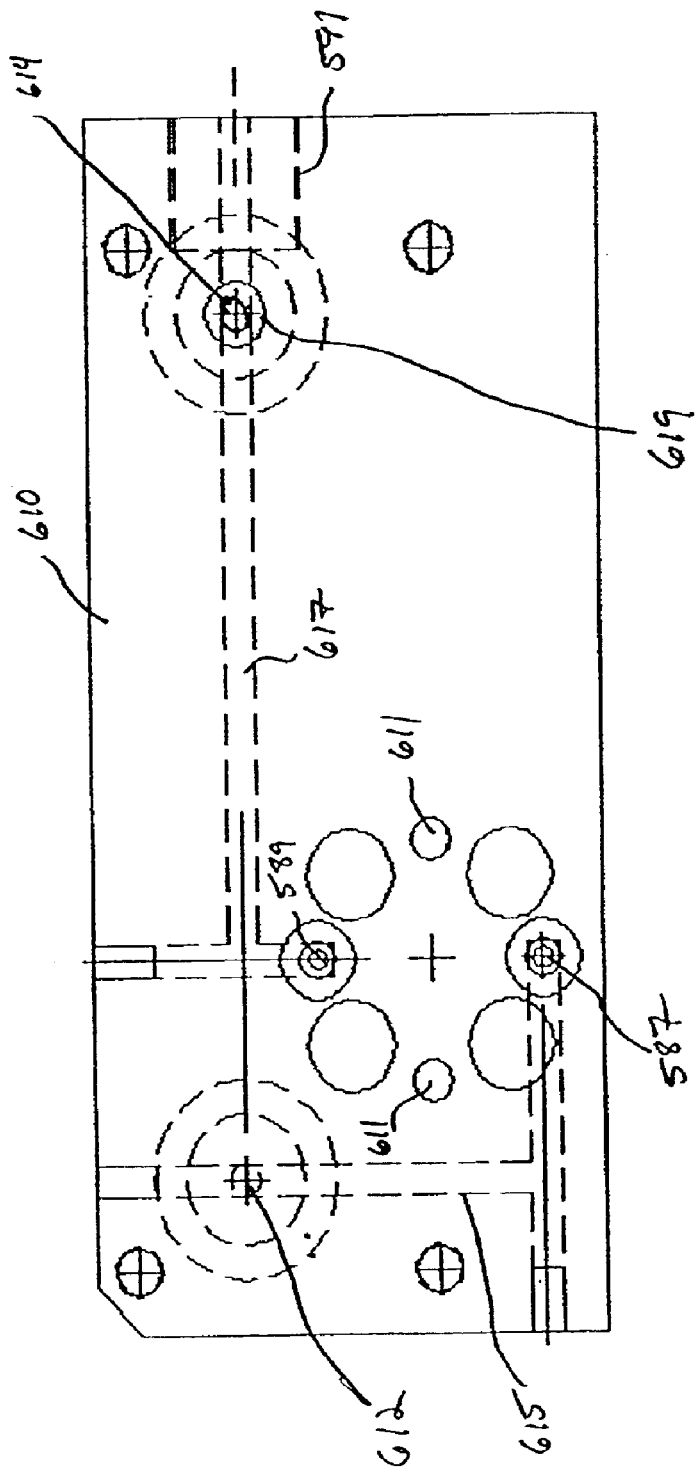
FIG. 18 is a top view of the manifold shown in FIG. 17.

An exemplary second IGLS design which is also suitable for implementing the IGLS 9 of FIG. 1, the IGLS 220 of FIG. 4, the IGLS 320 of FIG. 6, and/or the IGLS 420 of FIG. 8 is depicted in FIGS. 16 and 17. In particular, the second IGLS design is generally better suited for lower mass and volumetric flow rates than the first IGLS design. As depicted, the second IGLS design includes a body 546 made of 316 stainless steel or other similar material for improved tolerance characteristics, machining capabilities, temperature stability and increased tolerance to various gases. The body 546 has a first end portion 548 and a second end portion 550. The external profile of the body 546 is cylindrical and varies in size in correlation to the flow rate of the gas. A conical-shaped center shaft 42 is inserted into a precisely machined conical bore 544 within the body 546. The center shaft 42 comprises a cylindrical portion 52, a chamfer 54, and a conical portion 56.

The cylindrical 52, also contains a first machined bore 58 for receipt of a dowel pin (not shown) which allows the dowel pin to be press fit into the first machined bore 58. The body 546 contains a second machined bore (not shown) which allows the dowel pin to pass through the second machined bore forming a keyway such that the center shaft 42 can be removed and cleaned without the need for recalibration, i.e. the center shaft 42 can be inserted into its original position in terms of orientation.

Preferably the conical portion 56 of the center shaft 42 shall have a total angle between 1 degree and 10 degrees with an optimum angle of 2 to 6 degrees. The location of the center shaft 42 within the bore 544 is positioned in part by the use of a spring washer (not shown) and forms a flow gap 560 between the inner portion of the bore 544 and the conical portion 56 of the center shaft 42. With the conical shape and the ability to adjust the center shaft 42 for calibration, the flow can be accelerated or decelerated to obtain a polynomial relationship for leak test. The measurement taken is amplified by the use of typical amplifiers on the market to improve the accuracy of the readings.

The body 546 has the same number of inlet ports 572 drilled in the first end portion 550 of the body 546 to direct the gas flow from the spacer 68 to the center shaft 42. The spacer holes 100 align with the inlet ports 572 drilled in the first end portion 550 of the body 546 which allows the gas to pass through to the end cap 574.

A first and second end cap 570 and 574, respectively, are attached to the first and second end portions 548 and 550, respectively, of the body 546 to enclose the conical bore 544 and center shaft 42 within the body 546. During exemplary operation, the first end cap 570 functions as an outlet cap and the second end cap 574 functions as an inlet cap. The outlet and inlet end caps 570 and 574, respectively, are attached to the body 546 using typical fasteners available on the market, such as screws rotated into threaded holes in the body 546. The center of the first and second end caps 570 and 574, respectively, contain a first and second bore 576 and 578 to allow the gas to flow through each of the first and second end caps, 570 and 574, respectively.

The center shaft 42 is adjusted within the bore 544 using the spacer 68 machined to a precise dimension such that the spacer 68 located at the inlet end 564 of the center shaft 42 and the spring washer 580 located at the cylindrical portion 52 of the center shaft 42 position the center shaft 42 and hold it in place in a calibrated position. This design provides a unit where the calibration remains constant and can be modified with a spacer 68 of a different dimension.

Alternatively, the center shaft 42 could be calibrated using an adjusting screw or a calibrated locating cylinder at the second end portion 550 of the body 546 or the narrow end of the conical portion 56 of the center shaft 42. The spacer 68 is threaded and the adjusting screw can be adjusted by rotating the adjusting screw clockwise or counterclockwise to position the center shaft 42 according to calibration measurements. The adjusting screw and a spring washer 580 located at the cylindrical portion 52 of the center shaft 42 apply the appropriate forces to locate the center shaft 42 and hold it in place to provide for a uniform but adjustable gap 560 between the conical portion 56 of the center shaft 42 and the surface of the conical bore 544 within the body 546.

A first receiving port 582 and a second receiving port 584 are drilled in the body 546 to monitor the pressure differences in flow around the conical center shaft 42. The first receiving 582 port is drilled into the top side of the body 546 and extends from the top side of the body 546 to the conical bore 544 within the body 546. As illustrated, the first receiving port 582 is basically located outside or at the end of the gap 560 created by the conical portion 56 of the center shaft 42 and the conical bore 544. More specifically, the first receiving port 582 is positioned between the cylindrical portion 52 of the center shaft 42 and the first end cap 570.

The second receiving port 584 is also drilled in the top side of the body 546 and is located upstream of the first receiving port 582 or toward the smaller end of the conical center shaft 42. The second receiving port 584 also extends from the top side of the body 546 to the conical bore 544. As illustrated, the second receiving port 584 like the first receiving port 582 is basically located outside or at the end of the gap 560 created by the conical portion 56 of the center shaft 42 and the conical bore 544. More specifically, the second receiving port 584 is positioned between the inlet end 564 of the center shaft 42 and the second end cap 574.

The second IGLS design further includes a first pressure sensor or differential pressure sensor 586, a second pressure sensor or static pressure sensor 590, a temperature sensor 594, a manifold 610, and a housing base plate 620. In general, the manifold 610 is operable to route gas flow from the first receiving port 582 and the second receiving port 584 to the differential pressure sensor 586, the static pressure sensor 590, and the temperature sensor 594. To this end, the manifold 610 includes a first port 612 and a second port 614 that respectively engage the first receiving port 582 and the second receiving port 584 via the housing base plate 620. More specifically, the housing base plate 620 is mounted to the body 546 such that a first port 622 and a second port 624 of the housing base plate 620 engage the first receiving port 582 and the second receiving port 584, and the manifold 610 is mounted to the housing base plate 620 such that the first port 612 and the second port 614 of the manifold respectively engage the first port 622 and the second port 624 of the housing base plate 620. In an exemplary embodiment, the manifold 610 and the housing base plate 620 are constructed of 316 standard steel, the housing base plate 620 is welded to the body 546 such that ports 622, 624 engage the receiving ports 582, 584. Further, the manifold 610 is attached to the housing base plate 620 via screws inserted through holes 611 of the manifold 610 and into thread holes 621 of the housing base plate 620.

The manifold 610 further defines a first flow path 615 that pneumatically couples the first port 612 to a first port 587 of the differential pressure sensor 586 and a second flow path 617 that pneumatically couples the second port 614 to a second port 589 of the differential pressure sensor 588. Moreover, the second flow path 617 pneumatically couples the second port 614 to a static pressure sensor port 591 and routes gas flow by a temperature sensor recess 619 of the manifold 610. In this manner, the first flow path 615 and the second flow path 617 of the manifold 610 during operation respectively expose the first port 587 and second port 588 of the differential pressure sensor 586 to substantially the same pressure found at the first receiving port 582 and the second receiving port 584. Moreover, the second flow path 617 further exposes the static pressure sensor port 591 with substantially the same pressure found at the second receiving port 584 and exposes the temperature sensor recess 619 with substantially the same temperature found at the second receiving port 584.

The differential pressure sensor 586 generally generates a differential pressure signal indicative of the sensed differential pressure between a first port 587 and a second port 588. In the exemplary embodiment, the first port 587 and the second port 588 are pneumatically coupled to the first receiving port 582 and the second receiving port 584 via the manifold 610. Accordingly, the differential pressure sensor 586 of the exemplary embodiment is operable to generate the differential pressure signal such that the differential pressure signal is linear with respect to the differential pressure sensed between the first receiving port 582 and the second receiving port 584. More specifically, the differential pressure sensor of the exemplary embodiment is operable to sense differential pressures from 0 KPa to 0.0249 KPa, 0.0747 KPa, 0.125 KPa, 0.249 KPa, 1.25 KPa, 2.49 KPa, or 6.72 KPa full scale and to generate a linear DC differential pressure signal between 0 volts and 5 volts full scale in response thereto.

The static pressure sensor 590 of the exemplary second design is coupled to the static pressure sensor port 591 via a columnar housing 592 to measure static pressure within the flow gap 560. In the exemplary embodiment, the static pressure sensor 590 is exposed to the same gas flow as that of the second receiving port 584. In an exemplary embodiment, the static pressure sensor 590 is operable to generate the static pressure signal such that the static pressure signal is linear with respect to the static pressure sensed at the second port 584. More specifically, the static pressure sensor 590 of the exemplary embodiment is operable to sense static pressures from 0 KPa to 1.379 KPa, 103.425 KPa, 206.85 KPa, or 689.5 KPa full scale and to generate a linear DC static pressure signal between 0 volts and 5 volts full scale in response thereto.

As a result of the first receiving port 582 and the second receiving port 584 being located outside or at the end of the gap 560, the differential pressure sensor 586 and the static pressure sensor 590 respond more quickly to changes in pressures due to the flow path to the sensors 586, 590 being shorter and not restricted by the flow gap 560. Under low flow conditions, responsiveness becomes more of an issue because there is simply less gas flow to influence the pressure sensors 586, 590. Moreover, turbulent gas flow is directly related to the velocity of the gas flow. Accordingly, under low flow conditions, establishing a non-turbulent flow within the flow gap 560 is less of an issue than for the first IGLS design because of the gas flow is relatively non-turbulent due to the low velocity of the gas flow.

A temperature sensor 594 of the exemplary second design is mounted in the temperature sensor recess 619 of the manifold 610. More specifically, the temperature sensor 594 of the exemplary embodiment is mounted in the temperature sensor recess 619 via a thermal compound or glue. However, the temperature sensor 594 may be mounted to the manifold 610 via other manners. Further, the temperature sensor 594 could essentially be located at any location from which the temperature sensor 594 may accurately sense the temperature of the gas flow through the bore 544. The temperature sensor 594 of the exemplary second design comprises a typical RTD type sensor commonly used in the industry. In an exemplary embodiment, the temperature sensor 94 is operable to sense temperatures between 273 K and 353 K and respectively generate a linear DC temperature signal between 0 volts and 5 volts in response thereto.

A microcontroller 596 is connected to the sensors to record all the measurements, provide mathematical correlation polynomial equations, perform temperature and pressure compensation, display readings on an LCD display including pressure, flow, total mass, and other messages, control the valve sequence for leak test purposes using digital I/O signals, communicate to a personal computer for setup and data acquisition, provide pressure/flow control and send analog signals to remote devices, such as personal computers. The microcontroller 596 can take such measurements and perform such calculations for gas flowing in either direction within the body. Further, the microcontroller 596 can measure acceleration and deceleration for sensitivity and repeatability of the calculations. In an exemplary embodiment, the microcontroller 596 includes one or more A/D converters which receive the differential pressure signal, the static pressure signal, and temperature signal and convert them to a digital sample or count. The microcontroller 596 may alternatively be implemented without an A/D converter if the differential pressure sensor 586, the static pressure sensor 590 and the temperature sensor 594 are implemented to output digital signals instead of analog signals. The microcontroller 596 includes one or more D/A converters for controlling flow controllers 246, 346, 446 and/or pressure regulator 392.

The microcontroller 596, the differential pressure sensor and the static pressure sensor 90 of the exemplary are located within a housing or enclosure that includes the housing base plate 620 to protect the components from damage and to make the entire piece of equipment more attractive. On the outside of the enclosure an LCD display is mounted to display various messages to inform the user of measurement results and other messages. Also located on the outside of the enclosure is a start/stop button to start or stop a particular test.

Having set forth the structure of exemplary systems, the equations and computations used to calculate flow and leak detection will now be reviewed. As previously indicated, the above leak detection systems 20, 200, 300, 400 may be implemented with either the first IGLS design of FIG. 10 or the second IGLS design of FIG. 16. As explained below, the leak detection systems 20, 200, 300, 400 may also operate in either a viscous flow mode or a molecular flow mode. Under a common classification scheme, gas flow is classified as being in the continuum flow regime, the slip flow regime, the transition flow regime, or the free molecule flow regime. Traditionally, the continuum flow regime has been associated with a Knudsen number Kn less than 0.01, the slip flow regime has been associated with a Knudsen number Kn between 0.01 and 0.1, the transition flow regime has been associated with a Knudsen number Kn between 0.1 and 3.0, and the free molecule flow regime has been associated with a Knudsen number Kn greater than 3.0. Classically, the Knudsen number Kn has been defined as shown in equation (1):

$$Kn=\lambda/L \quad (1)$$

where $\lambda$ is the mean free path and L is the significant characteristic linear dimension.

As is known to those skilled in the art, the mean free path $\lambda$ is mostly dependent upon characteristics of the gas such as temperature, pressure, density, etc whereas the significant characteristic dimension L is mostly dependent upon the geometry apparatus that the gas is flowing through. Accordingly, a person can easily adjust the operating conditions and the dimensions of the flow gap 60, 560 in order to achieve the desired Knudsen number Kn and therefore the desired operating regime for a given test.

While different mathematical models may be used to model gas flow in each of the continuum flow regime, the slip flow regime, the transition flow regime, and the free molecule flow regime, highly accurate results have been obtained with the exemplary leak detection systems 20, 200, 300, 400 using only two mathematical models to calculate the total mass extracted during the test period. As used herein, the first mathematical model is referred to as the viscous flow model and the second mathematical model is referred to as the molecular flow model. In an exemplary embodiment, a Knudsen Kn number of 0.6 is used as the cutoff point between the viscous flow model and the molecular flow model. In other words, if the leak detection system 20, 200, 300, 400 is configured to develop a gas flow within the flow gap 60, 560 having a Knudsen number Kn less than 0.6, then the leak detection system 20, 200, 300, 400 is further configured to calculate the gas flow parameter during the test period according to the viscous flow model. Further, if the leak detection system 20, 200, 300, 400 is configured to develop a gas flow within the flow gap 60, 560 with Knudsen number Kn greater than 0.6, then the leak detection system is further configured to calculate the gas flow parameter during the test period according to the molecular flow model.

Whether using the viscous flow model or the molecular flow model, the flow calculation algorithms of the exemplary embodiment are segmented into viscosity calculations, density calculations, volumetric flow calculations, mass flow calculations, temperature compensation, and total mass calculations. The equations for viscosity calculation and density calculation are common. The equations for volumetric flow calculation, the x value (see below) and mass flow are modifications of equations contained in a published paper. The Proceeding of the Second International Symposium On Flow on Mar. 23–26, 1981 in St. Louis, Mo. sponsored by Instrument Society of America ISA) and authored by David A Todd. The combination of the use of these equations enables the software to use a universal calibration curve that is embedded in the microprocessor 96, 596. Consequently, the Gas Constant (R), compressibility factor z, and the viscosity data is downloaded from the software program for a particular gas and pressure and the need to recalibrate the sensor is eliminated.

The equations for temperature compensation were developed to allow for thermal expansion. In an exemplary embodiment, the flow components which come into contact with the gas flow are made of the same material so that each of the components demonstrates equal temperature effects.

Focusing now on the viscous flow model, the temperature dependent viscosity calculation is represented by the following equation (2):

$$\mu=\mu_0(1+C(T-T_0)) \quad (2)$$

where $\mu_0$ represents viscosity at temperature $T_0$; $T_0$ represents the calibration temperature; C represents a constant slope for one particular gas type; and T represents the temperature of the gas (i.e. the temperature sensed by temperature sensors 94, 594).

The density calculation is represented by the following calculation:

$$D = \frac{P_S}{z*R*T} \quad (3)$$

where D represents the density of the gas; R represents the universal gas constant, T represents the absolute temperature of the gas measured by the temperature sensor 94, 594 (K); $P_S$ represents the absolute pressure measured by the static pressure sensor 90, 590 (KPa); and z represents a compressibility factor for the gas.

The x value used in the flow calculations is calculated by the following calculation:

$$x = \frac{D*dP}{\mu^2} \quad (4)$$

where dP represents the measured differential pressure in A/D counts.

The volumetric flow calculation is based on the polynomial coefficient and the differential pressure measurement as follows:

$$Q=(C_0+C_1x+C_2x^2+C_3x^3)*\mu/D \quad (5)$$

The mass flow calculation is based on the following formula:

$$dM/dt=(C_0+C_1x+C_2x^2+C_3x^3)*\mu \quad (6)$$

Coefficients $C_0$, $C_1$, $C_2$ and $C_3$ generally differ from temperature to temperature due to the thermal expansion of the center shaft 42. Based on the calibration in the desired temperature range, K was developed to reflect the changes. K is dependent on the thermal coefficient a of the material used. Thus, the equations for temperature compensation are as follows:

$$Q=K \cdot (C_0+C_1x+C_2x^2+C_3x^3)*\mu/D \quad (7)$$

$$dM/dt=K \cdot (C_0+C_1x+C_2x^2+C_3x^3)*\mu \quad (8)$$

$$K=1+\alpha_1 \cdot (T-T_0)+\alpha_2 \cdot (T-T_0)^2 \quad (9)$$

From the temperature compensated values for mass flow rate dM/dt, the total mass M of gas flow over a test period $T_p$ may be obtained from the following equation:

$$M = \int_0^{T_p} (dM/dt)dt \qquad (10)$$

which in essence integrates the mass flow rate dM/dt over the test period $T_p$. Those skilled in the art should appreciate that the above integration may be approximated in a discrete system by multiplying the mass flow rate $(dM/dt)_n$ obtained for each discrete interval n over the test period $T_p$ by the duration $t_n$ of each discrete interval n and summing the products as represented by the following equation:

$$M = \sum_{n=0}^{T_p} (dM/dt)_n * t_n \qquad (11)$$

For low leak flow situations, it has been found that coefficients $C_0$, $C_2$, and $C_3$ of above-equations (9) and (10) are zero or small enough to equate to zero without effecting the accuracy of the flow measurements of the leak detection systems 20, 200, 300, 400. Accordingly, for low leak situations, the volumetric flow of the gas through the IGLS is not dependent upon the density of the gas as illustrated by the following equation:

$$Q = K'*dP/\mu \qquad (12)$$

where K' is a composite coefficient of $C_1$ times K The mass flow may then be calculated from the volumetric flow based upon equation (13).

$$dM/dt = Q*D \qquad (13)$$

where Q is the volumetric flow rate calculated based upon equation (12) and D is the density of the gas calculated based upon equation (3).

The following equation (14) which is equation (13) rewritten for calculating volumetric flow rate Q better illustrates an amplification effect the density D has on the volumetric flow rate Q for a given mass flow rate dM/dt:

$$Q = (dM/dt)/D \qquad (14)$$

Accordingly, increasing the volumetric flow rate Q through the IGLS 9, 220, 320, 420 will therefore result in an increased pressure differential dP across the IGLS 9, 220, 320, 420 that is applied to the differential pressure sensor of the leak detection systems 20, 200, 300, 400. From the above equations, it is clear that lowering the static pressure applied (i.e. the reference pressure) by the pressure systems 14, 240, 340, 440 to the UUT with other things remaining equal results in an increased volumetric flow rate Q through the IGLS 9, 220, 320, 420. In fact, lowering the reference pressure will increase the pressure differential dP and the volumetric flow rate Q until the velocity of the gas reaches the speed of sound at which point the flow becomes "choked" flow. Once the velocity of the gas reaches the speed of sound, further lowering the reference pressure increases the pressure differential dP but not the volumetric flow rate Q; however, the increased pressure differential dP does result in an increase static pressure sensed by the static pressure sensor 90, 590 resulting in higher mass flow M for the same volumetric flow rate Q.

Applying a low pressure to the IGLS 9, 220, 320, 420 via the pressure systems 14, 240, 340, 440, accordingly, enables the IGLS 9, 220, 320, 420 to accurately measure small mass leak flow (e.g. 5 micrograms/min) based upon the above viscous flow model. For example, a mass flow rate of approximately 1162 micrograms/min of air at 50.6 KPa will result in a volumetric flow rate of approximately 2 cc/min. The same mass leak flow at 101.3 KPa (approximate barometric conditions) will result in a volumetric flow rate of approximately 1 cc/min. Utilizing a strong vacuum of 5 KPa, an exemplary IGLS has been constructed which can accurately measure mass flow rates as low as 5 micrograms/min of air in the viscous mode of operation. As used herein, a strong vacuum indicates a reference pressure below 50.6 KPa and more particularly to a reference pressure between 25.3 KPa and 1.33 KPa.

Focusing now on the molecular flow model, the Applicant has found that the mass flow rate dM/dt through the IGLS 9, 220, 320, 420 is linear with respect to the differential pressure dP sensed by the differential pressure sensor regardless of inlet pressure. Accordingly, the IGLS 9, 220, 320, 420 may calculate the mass flow rate based simply upon the differential pressure dP and calibrations constants as show in the following equation (15):

$$dM/dt = C_4 + (C_5 * dP) \qquad (15)$$

where $C_4$ and $C_5$ are calibration constants. Since the differential pressure sensor in an exemplary embodiment generates a differential pressure signal that is linear with respect to the differential pressure applied to the differential pressure signal, the IGLS 9, 220, 320, 420 simply uses the A/D count or sample for the dP of equation (15). Alternatively, the IGLS 9, 220, 320, 420 may determine the actual differential pressure dP and use the determined differential pressure in equation (15).

In order to enter the molecular flow mode of operation, the pressure systems 14, 240, 340, 440 typically applies an extremely low pressure to the IGLS 9, 220, 320, 420 in order to develop a gas flow through the flow gap 60, 560 having a Knudsen number greater than 0.6. Applying an extremely low pressure to the IGLS 9, 220, 320, 420 via the pressure systems 14, 240, 340, 440, accordingly, enables the IGLS 9, 220, 320, 420 to accurately measure small mass leak flow rates. In particular, leak detection systems 20, 200, 300, 400 have been constructed which can accurately measure mass flow rates below 50 micrograms/min, below 10 micrograms/min, below 5 micrograms/min, below 1 microgram/min, and below 0.02 micrograms/min. As used herein, an extremely strong vacuum indicates a reference pressure below 1.33 KPa, more particularly to a reference pressure below 0.665 KPa, and particularly to a reference pressure below 0.133 KPa.

In the exemplary embodiments, the IGLS 20, 200, 300, 400 uses computer software embedded in the microcontroller 596 to allow the user to easily adjust the function parameters and incorporate the mathematical equations discussed above. The embedded software is designed to use "flags" for different applications. The following describes Leak-Tek™ software executed by a general purpose computer system detachably coupled to the IGLS 9 in order to configure the IGLS 9, receive data from the IGLS 9, and store data from the IGLS 9 for future analysis description of the software screens below and the above-described flowchart of FIG. 3 demonstrate the process used by the software.

The initial main screen the Leak-Tek™ software allows the user to enter test parameters (setup screen), configure the software and the IGLS 9 or calibrate the IGLS 9 (calibration and configuration screens), load and analyze previous test data files (SPC screen) or exit the software program (main screen).

The setup screen allows a user to perform a variety of tasks and allows access to a run screen and a part data screen. The setup screen allows a user to perform the functions listed below:

choose a sensor for a test;

choose from a predefined list of units for temperature, pressure, time base, and flow units;

enter test parameters such as part number, part name or description, and test fill delay time;

enter parameters pertaining to gas parameters as used in a test;

add, delete or load part data from a database file;

set a pressure at which to perform the test set high and low pressure limits or thresholds that trigger a fault when reached or surpassed;

run a leak test via the run screen;

save setup screen parameters to a datafile;

download setup screen parameters to the IGLS 9 including gas constants;

upload setup parameters from the IGLS 9;

exit setup screen to main screen; and print current setup information.

The run screen can be accessed from the main screen to allow a user to choose a sensor for a test, save test data to a file for statistical process control (SPC) analysis, automatically save test data into a data file for SPC analysis upon each test conducted, or exit back to the main screen.

The setup screen allows the user to choose part setup data from a data file, add a new part number and description to the part data file, delete an obsolete part from the data file, or exit back to the main screen.

The configuration screen can be accessed from the main screen and allows a user to choose a sensor for a test, to enter PID parameters, to choose the COMM port used by the computer to communicate with the microcontroller 96, 596, to provide the coefficients needed by the microcontroller 96, 596 to perform the appropriate flow calculations, to enable remote clamping, to enable automatic fill, to enable automatic pressuring or vacuuming, to enable total mass calculations, total volume calculations, mass flow rate calculations, and volumetric flow rate calculations, to set the buffer size for a particular set of test data, to save configuration data parameters to a data file, to download configuration parameters to a sensor in the test as well as a data file, to upload configuration parameters from a sensor, or to exit back to the main screen. The configuration screen also allows the user to access the calibration screen. There are three calibration choices in the configuration screen: temperature, flow rate and static pressure. Either of these "buttons" can be chosen in the configuration screen and each will allow the user to access the calibration screen. The "button" chosen in the configuration screen will determine which sensor will be calibrated in the calibration screen.

The user in the configuration screen will also be allowed to select the operating mode. In particular the user in may select an automatic leak detection mode in which the microcontroller 96, 596 controls valves of the test system, or a manual leak detection mode which sets the test in a manual mode without PID control.

The calibration screen can be accessed as discussed earlier from the configuration screen. The calibration screen allows the user to enter a standard in the third column of the calibration parameters table to determine a percent error during the calibration process, to examine the offset and slope for the collected calibration date, to capture a count for data analysis, to download new calibration parameters into the IGLS 9, to remove a data point or to exit back to the configuration screen.

The final screen that can be accessed from the main screen is the SPC screen which allows the user to view X-bar and R charts from ASCII (comma separated value) CSV files generated from the test screen, to load a CSV file for analysis, to examine an SPC analysis of a currently loaded CSV file, or to exit back to the main screen.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention are desired to be protected.

What is claimed is:

1. A leak detection system for testing a product having an opening for leak testing, comprising:

a pressure system that maintains a reference pressure of less than 50.6 KPa during a test period; and a leak sensor coupled to the opening of the product via a first conduit and the pressure system via a second conduit, the leak sensor being operable to receive the reference pressure via the second conduit and apply the reference pressure to the product via the first conduit, develop a gas flow in one of the slip and molecular regimes from the product through the leak sensor to the pressure system as a result of applying the reference pressure to the product, and determine, based upon the gas flow through the leak sensor, whether the product leaked an unacceptable amount during the test period.

2. The leak detection system of claim 1, wherein the pressure system maintains the reference pressure below 25.3 KPa.

3. The leak detection system of claim 1, wherein the pressure system maintains the reference pressure below 5 KPa.

4. The leak detection system of claim 1, wherein the pressure system maintains the reference pressure below 1.33 KPa.

5. The leak detection system of claim 1, wherein the pressure system maintains the reference pressure below 0.665 KPa.

6. The leak detection system of claim 1, wherein the pressure system maintains the reference pressure below 0.133 KPa.

7. A leak detection system for testing a product having an opening for leak testing, comprising:

a pressure system that maintains a reference pressure of less than 50.6 KPa during a test period;

a leak sensor coupled to the opening of the product via a first conduit and the pressure system via a second conduit, the leak sensor including a static pressure sensor that senses a static pressure developed in the leak sensor, the leak sensor being operable to receive the reference pressure via the second conduit and apply the reference pressure to the product via the first conduit, develop a gas flow in one of the slip and molecular regimes from the product through the leak sensor to the pressure system as a result of applying the reference pressure to the product, and determine, based upon the gas flow through the leak sensor, whether the product leaked an unacceptable amount during the test period, and adjust the reference pressure via the flow controller in order to maintain the static pressure in the leak sensor at a predetermined level; and a flow controller coupled to the leak sensor that is operable to adjust the reference pressure applied to the product.

8. The leak detection system of claim 1, wherein the leak sensor comprises:

a body comprising a conical bore between a first end and a second of the body, a first receiving port through the body to the conical bore, and a second receiving port through the body to the conical bore, a center shaft positioned within the conical bore to define a flow gap such that a first end of the center shaft is within the conical bore and a second end of the center shaft is within the conical bore, a differential pressure sensor coupled to the conical bore via the first receiving port and the second receiving port, the differential pressure sensor operable to generate a differential pressure signal representative of a differential pressure developed between the first receiving port and the second receiving port, and a microcontroller coupled to the differential pressure sensor to receive the differential pressure signal, the microcontroller operable to determine whether the product leaked an unacceptable amount during the test period based upon the differential pressure signal, wherein the first receiving port is located between the first end of the body and the first end of the center shaft and the second receiving port is located between the second end of the body and the second end of the center shaft.

9. The leak detection system of claim 1, wherein the leak sensor comprises:

a body comprising a conical bore between a first end and a second of the body, a first receiving port through the body to the conical bore, and a second receiving port through the body to the conical bore, a center shaft positioned within the conical bore to define a flow gap, a manifold coupled to the body such that the manifold routes the first receiving port of the body to a first port of the manifold and the second receiving port of the body to a second port of the manifold, a differential pressure sensor coupled to the first receiving port and the second receiving port via the first port and the second port of the manifold, respectively, the differential pressure sensor being operable to generate a differential pressure signal representative of a differential pressure developed between the first receiving port and the second receiving port, and a microcontroller coupled to the differential pressure sensor to receive the differential pressure signal, the microcontroller operable to determine whether the product leaked an unacceptable amount during the test period based upon the differential pressure signal.

10. A leak detection system for testing a product for leaks, comprising:

a pressure system that maintains a reference pressure of less than 50.6 KPa during a test period;

a leak sensor coupled via a first conduit to a chamber configured to receive the product and via a second conduit to the pressure system, the leak sensor being operable to receive the reference pressure via the second conduit and apply the reference pressure to the product via the first conduit, develop a gas flow from the product through the leak sensor to the pressure system as a result of applying the reference pressure to the product, and determine, based upon the gas flow through the leak sensor, whether the product leaked an unacceptable amount during the test period; and a second pressure system coupled to the product to apply a test pressure to an interior of the product wherein the test pressure applied to the interior of the product is a maximum operating pressure for the product.

11. A leak detection system for testing a product for leaks, comprising:

a pressure system that maintains a reference pressure of less than 50.6 KPa during a test period;

a leak sensor coupled via a first conduit to a chamber configured to receive the product and via a second conduit to the pressure system, the leak sensor being operable to receive the reference pressure via the second conduit and apply the reference pressure to the product via the first conduit, develop a gas flow from the product through the leak sensor to the pressure system as a result of applying the reference pressure to the product, and determine, based upon the gas flow through the leak sensor, whether the product leaked an unacceptable amount during the test period; and a second pressure system coupled to the product to apply a test pressure to an interior of the product wherein the test pressure applied to the interior of the product is above a maximum operating pressure for the product.

* * * * *